United States Patent
DeVault

(10) Patent No.: US 7,849,944 B2
(45) Date of Patent: Dec. 14, 2010

(54) SELF-LEARNING CONTROL SYSTEM FOR PLUG-IN HYBRID VEHICLES

(75) Inventor: Robert C. DeVault, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 435 days.

(21) Appl. No.: 12/137,744

(22) Filed: Jun. 12, 2008

(65) Prior Publication Data
US 2009/0114463 A1    May 7, 2009

Related U.S. Application Data

(60) Provisional application No. 60/943,328, filed on Jun. 12, 2007.

(51) Int. Cl.
*B60W 10/24* (2006.01)
(52) U.S. Cl. .............. 180/65.29; 180/65.275; 180/65.265; 701/22
(58) Field of Classification Search .......... 180/243, 180/65.235, 65.29, 65.265, 65.275, 65.27; 701/22, 202, 201, 213; 903/903, 906, 910; 320/134, 155, 132
See application file for complete search history.

(56) References Cited

U.S. PATENT DOCUMENTS

| | | | | |
|---|---|---|---|---|
| 5,176,213 | A | 1/1993 | Kawai et al. .............. 180/243 |
| 5,614,804 | A * | 3/1997 | Kayano et al. ............. 320/134 |
| 5,623,194 | A * | 4/1997 | Boll et al. ................. 320/137 |
| 5,815,824 | A | 9/1998 | Saga et al. ................. 701/22 |
| 5,892,346 | A | 4/1999 | Moroto et al. ............. 318/587 |
| 6,016,795 | A | 1/2000 | Ohki ........................ 123/681 |
| 6,052,646 | A * | 4/2000 | Kirkhart et al. ............ 701/213 |
| 6,202,024 | B1 | 3/2001 | Yokoyama et al. .......... 701/207 |
| 6,242,873 | B1 | 6/2001 | Drozdz et al. .............. 318/139 |
| 6,249,723 | B1 * | 6/2001 | Lutz .......................... 701/22 |
| 6,314,347 | B1 | 11/2001 | Kuroda et al. ............... 701/22 |
| 6,338,391 | B1 | 1/2002 | Severinsky et al. ......... 180/65.2 |
| 6,381,522 | B1 | 4/2002 | Watanabe et al. ............. 701/22 |

(Continued)

OTHER PUBLICATIONS

GM Study Shows E-REVs Could Cut PHEV Real-World Fuel Consumption by More Than 50%; Feb. 13, 2008; Green Car Congress; www.greencarcongress.com/2008/02/gm-study-shows.html.

*Primary Examiner*—Hau V Phan
(74) *Attorney, Agent, or Firm*—Brinks Hofer Gilson & Lione

(57) ABSTRACT

A system is provided to instruct a plug-in hybrid electric vehicle how optimally to use electric propulsion from a rechargeable energy storage device to reach an electric recharging station, while maintaining as high a state of charge (SOC) as desired along the route prior to arriving at the recharging station at a minimum SOC. The system can include the step of calculating a straight-line distance and/or actual distance between an orientation point and the determined instant present location to determine when to initiate optimally a charge depleting phase. The system can limit extended driving on a deeply discharged rechargeable energy storage device and reduce the number of deep discharge cycles for the rechargeable energy storage device, thereby improving the effective lifetime of the rechargeable energy storage device. This "Just-in-Time strategy can be initiated automatically without operator input to accommodate the unsophisticated operator and without needing a navigation system/GPS input.

38 Claims, 12 Drawing Sheets

U.S. PATENT DOCUMENTS

| | | | |
|---|---|---|---|
| 6,470,983 B1 * | 10/2002 | Amano et al. | 180/65.235 |
| 6,487,477 B1 | 11/2002 | Woestman et al. | 701/22 |
| 6,625,539 B1 | 9/2003 | Kittell et al. | 701/213 |
| 6,687,607 B2 | 2/2004 | Graf et al. | 701/202 |
| 6,697,717 B2 | 2/2004 | Shioda et al. | 701/22 |
| 6,876,098 B1 | 4/2005 | Gray, Jr. | 290/40 D |
| 7,013,205 B1 | 3/2006 | Hafner et al. | 701/22 |
| 7,240,750 B2 | 7/2007 | Patel | 180/65.2 |
| 7,402,978 B2 | 7/2008 | Pryor | 320/104 |
| 7,598,743 B2 * | 10/2009 | Bertness | 320/132 |
| 7,679,336 B2 * | 3/2010 | Gale et al. | 320/155 |
| 7,778,746 B2 * | 8/2010 | McLeod et al. | 701/22 |
| 2004/0204797 A1 | 10/2004 | Vickers | 701/1 |
| 2005/0228553 A1 | 10/2005 | Tryon | 701/22 |
| 2006/0142915 A1 | 6/2006 | Isono et al. | 701/36 |
| 2006/0278449 A1 | 12/2006 | Torre-Bueno | 180/65.2 |
| 2007/0208467 A1 | 9/2007 | Maguire et al. | 701/22 |
| 2008/0262668 A1 | 10/2008 | Yamada | 701/22 |

* cited by examiner

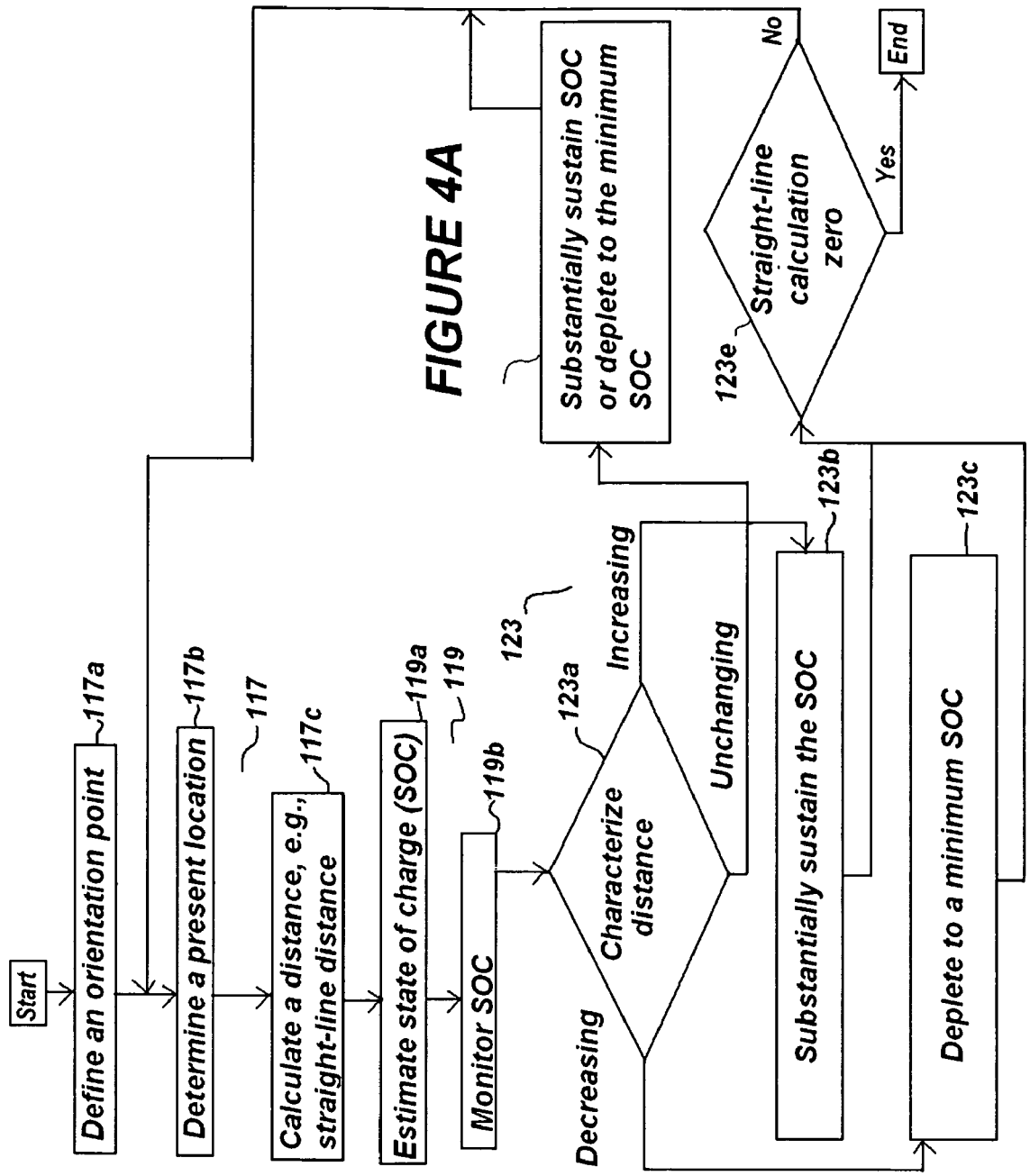

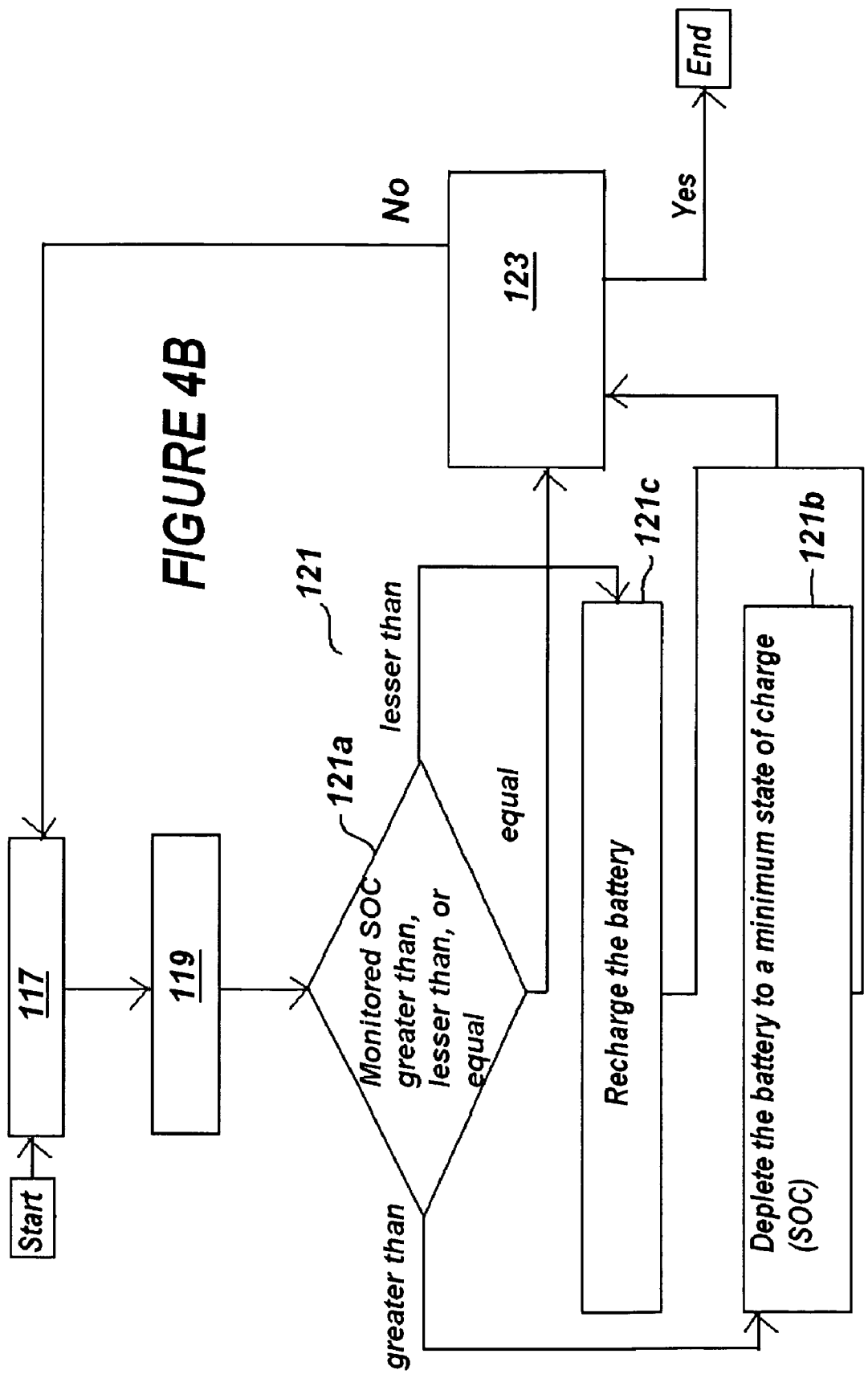

| Destination (134) | Total Actual Distance From A (miles) (125) | Straight-line Distance From A (miles) (120) |
|---|---|---|
| A | 0 | 0 |
| B | 16 | 7 |
| C | 20.5 | 9 |
| D | 18 | 8.5 |
| E | 8 | 6.2 |
| F | 2 | 2 |
| G | 26.5 | 14 |

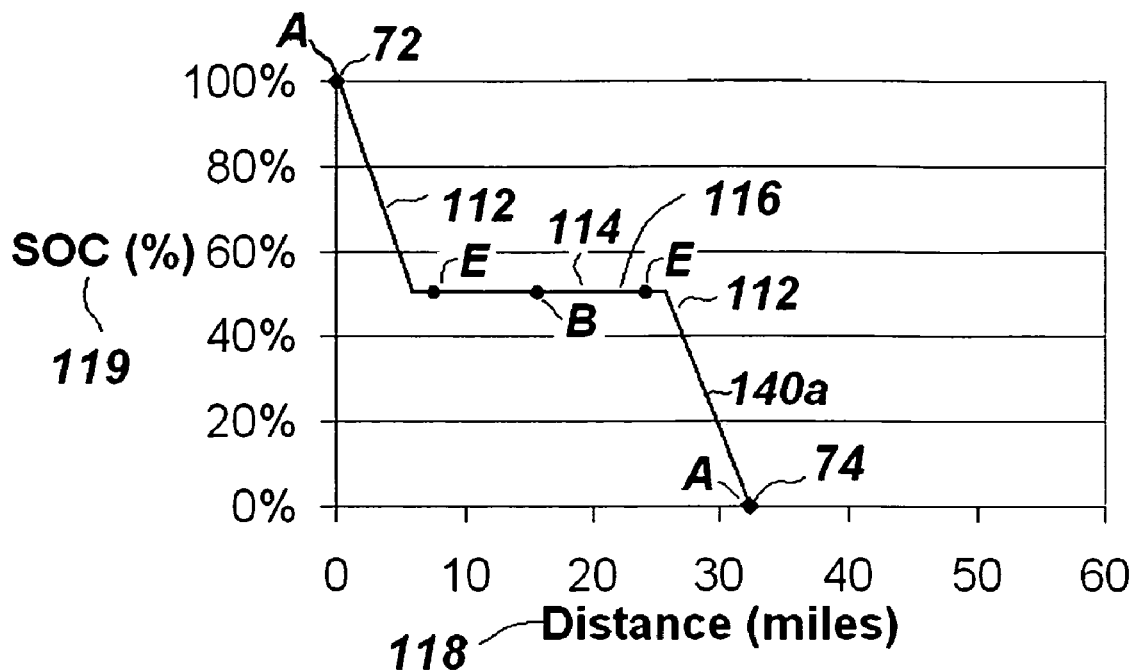
FIGURE 5C—140a
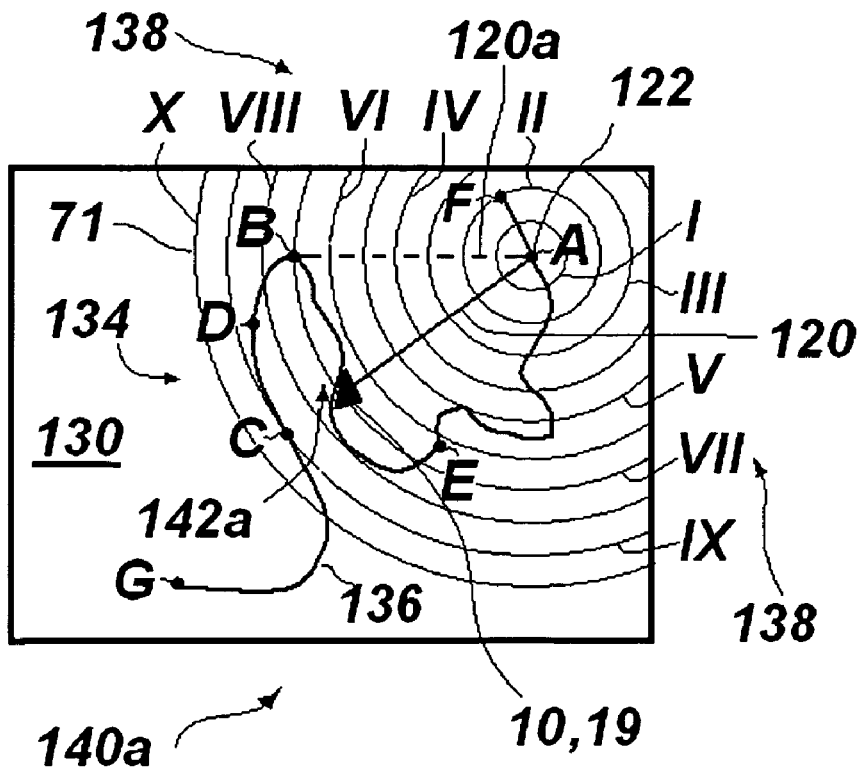
FIGURE 5D

SELF-LEARNING CONTROL SYSTEM FOR PLUG-IN HYBRID VEHICLES

CROSS-REFERENCE TO RELATED APPLICATIONS

This application claims the benefit of U.S. Provisional Patent Application No. 60/943,328, entitled "Self Learning Control Method For Plug-In Hybrid Vehicles" filed on Jun. 12, 2007, which is incorporated herein by reference in its entirety.

STATEMENT REGARDING FEDERALLY SPONSORED RESEARCH

This invention was made with United States Government support under Contract No. DE-AC05-00OR22725 awarded by the United States Department of Energy. The United States Government has certain rights in the invention.

BACKGROUND

1. Field of the Invention

The present invention generally relates to the operation of hybrid vehicles powered both by electricity from rechargeable energy storage devices, such as batteries, and by consumable fuel powered means, such as an internal combustion engine or a fuel cell. More particularly, the present invention relates to optimizing the lifetime of rechargeable energy storage devices in plug-in hybrid electric vehicles.

2. Background of the Invention

Hybrid vehicles, which use a combination of consumable fuel and battery-stored electricity, are becoming a major segment of the automobile market. Such hybrid vehicles are displacing electric-only vehicles, as well as conventional Such hybrid vehicles are displacing electric-only vehicles, as well as conventional vehicles powered solely by internal combustion engines or other consumable fuel powered means. Plug-in hybrid electric vehicles generally have both an onboard means to recharge the battery and a means to recharge from an external electrical source, i.e., the electrical grid. The onboard means may consist of an internal combustion engine (powered by gasoline, diesel, ethanol, natural gas, hydrogen or another combustible fuel), regenerative means (energy recovered when braking or coasting) or which may be a hydrogen fuel cell or other alternative consumable-fuel-based power unit.

Battery life is important in plug-in hybrid electric vehicles because the plug-in hybrid electric vehicle more fully utilizes the full cycle capability of the battery numerous times. Consequently, plug-in hybrid electric vehicles typically experience deeper battery charging and discharging cycles than other hybrid vehicles. The instant state of charge (SOC) of the rechargeable battery is related to the total distance a vehicle can travel solely using a fully charged battery. When the SOC is, at a maximum SOC, the vehicle can travel the maximum distance, and when the SOC is at a minimum SOC, the vehicle can no longer travel using the battery alone but must use the onboard means to recharge the battery and/or to continue travel. It is not uncommon for battery discharging cycles to occur during an early part of a trip until the minimum SOC is reached. Then, for the rest of the trip, the battery is at the minimum SOC, which can be a deeply discharged state. Since most vehicles travel 30-120 miles per day, the majority of the miles of the standard 20-mile range battery powered electric motor would be driven under the deeply discharged battery. Extended driving on a deeply discharged battery can unnecessarily shorten the life of the battery, making the battery less durable. Expending resources to redesign the battery to make it more durable can not only be expensive, but also lead to a more expensive battery and hybrid vehicle, hindering the marketability of the hybrid vehicle.

SUMMARY

A system is provided to enable a plug-in hybrid electric vehicle optimally to use electric propulsion from a rechargeable energy storage device, such as a battery, to reach an electric recharging station. The system can maintain as high a rechargeable energy storage device state of charge (SOC) as possible or as is otherwise desirable for long battery life along a route prior to arriving at the electric recharging station at a minimum SOC. Accordingly, this "Just-in-Time" strategy results in the plug-in hybrid electric vehicle arriving at the electric recharging station with the minimum rechargeable energy storage device SOC. This can optimize the electric energy from the rechargeable energy storage device used along the route, and can maximize the recharge energy of the rechargeable energy storage device during a stop at the electric recharging station.

A system for optimizing rechargeable energy storage device depletion may be used with a plug-in hybrid electric vehicle having an electric motor and a consumable fuel powered means, such as an internal combustion engine or fuel cell. A rechargeable energy storage device is included in the hybrid electric vehicle to power the electric motor, and can be configured to be recharged from a recharging station, regenerative means, the consumable fuel powered means. The rechargeable energy storage device is to operate within the recommended SOC levels, including a minimum SOC, a maximum SOC and an optimal SOC. The system includes a controller having a computer configured to receive data inputs, execute instructions, and provide outputs. The data inputs can describe one or more of the following, which is not exhaustive: an orientation point of the recharging station, a current location of the vehicle, a straight-line distance between the current location of the vehicle and the orientation point, and a monitored SOC of the rechargeable energy storage device. The instructions are executable by the computer to enable the controller to determine an optimal rechargeable energy storage device depletion strategy. The optimal rechargeable energy storage device depletion strategy can be based on the straight-line distance to substantially sustain the monitored SOC, preferably at an optimal SOC, when the straight-line distance is equal to or greater than the instant limited distance requirement of said rechargeable energy storage device, to selectively deplete the rechargeable energy storage device to reach about the minimum state of charge SOC as the straight-line distance approaches about zero, or both. The controller is configured to generate the outputs to implement the optimal rechargeable energy storage device depletion strategy of the vehicle.

In one embodiment, a method of optimizing the depletion of a rechargeable energy storage device of a plug-in hybrid electric vehicle to a minimum state of charge SOC is also provided. The method can include the step of defining an orientation point representative of a geographic location of a recharging station. A present location of the vehicle can also be repeatedly determined. The method can also include repeatedly calculating a straight-line distance between the orientation point and the determined present location of the vehicle. An SOC of the rechargeable energy storage device can be monitored. Additionally, the method can include substantially sustaining the monitored SOC of the rechargeable energy storage device when the calculated straight-line distance from the orientation point is equal to or greater than the instant limited distance requirement of said rechargeable energy storage device, depleting the rechargeable energy storage device to the minimum SOC when the calculated straight-line distance is decreasing from the orientation point, with the rechargeable energy storage device being about at the minimum SOC when the calculated straight-line distance is about zero, or both. In one aspect, when the calculated straight-line distance remains substantially unchanged, the method can be one of selectively substantially sustaining, selectively recharging, or selectively depleting the instant monitored SOC of the rechargeable energy storage device to the minimum SOC or the optimal SOC, depending on whether the instant monitored SOC is the same as, less than, or greater than the desired optimal SOC.

Furthermore, in another aspect, the method can include comparing the calculated straight-line distance with a predetermined limited distance requirement of said rechargeable energy storage device, and depleting said rechargeable energy storage device to said minimum SOC when the calculated straight-line distance is less than the limited distance requirement of said rechargeable energy storage device. Other methods are provided, including using an actual distance from the vehicle to the recharging station to optimize the rechargeable energy storage device depletion. The methods can be performed fully automated without external input from outside the vehicle or the operator, i.e., without a global positioning system (GPS), a navigation system, map database, and/or operator interface. On the other hand, the methods can be performed with external inputs from outside the vehicle, including a navigation system, global positioning system (GPS), transmitted radio frequency, a map database, and/or the operator defined input, with the navigation system or global positioning (GPS) possibly being detachable from the vehicle.

Yet, in another aspect, the method can avoid identifying in advance any potentially new recharging stations. The method can be based on "self learning" and keeping track of previously used recharging stations. Even over the lifetime of the vehicle with potentially using multiple new recharging stations, there may be only a tiny additional potential fuel savings benefit, since the "cost" of not identifying a new potential recharging station in advance is less than about ¼ gallon of gasoline for a 20 mile range rechargeable energy storage device. The method can include sensing an input signal indicative of a first recharging station, and defining the orientation point representative of the geographic location of the first recharging station. The method can further include sensing an input signal indicative of a second recharging station at a different geographic location than the first recharging station, and storing a destination point representative of the geographic location of the second recharging station. The method can calculate and compare each of the first straight-line distance from the first recharging station to the orientation point and the second straight-line distance from the second recharging station to the destination point with a predetermined limited distance requirement to initiate phases for optimizing depletion of the rechargeable energy storage device.

In another embodiment, a computer-usable medium comprising a plurality of computer readable instructions stored thereon that are responsive to execution by a processor is also provided. The computer readable instructions can cause the processor to generate and store an orientation point for a plug-in hybrid vehicle having a rechargeable energy storage device. The orientation point can be a recharging station. The computer readable instructions can cause the processor to determine, at a first time instant, a first straight-line distance between a first current location of the vehicle and the orientation point, and determine, at a second time instant, a second straight-line distance between a second current location of the vehicle and the orientation point. The computer readable instructions can cause the processor to initiate a charge sustaining phase when the second straight-line distance is greater than the first straight-line distance and the instant monitored SOC of the rechargeable energy storage device to is about the same as the desired optimal SOC. The computer readable instructions can cause the processor to initiate a charge depleting phase when the second straight-line distance is less than the first straight-line distance, and the second straight-line distance is within a predetermined limited distance requirement of the vehicle rechargeable energy storage device.

In addition, the computer readable instructions can cause the processor to determine a recharge time from the recharging station during a period of lowest grid electric demand. Based on the recharge time, the computer readable instructions can cause the processor to initiate recharge at the determined recharge time with electricity from the detected recharging station. In another example, the computer readable instructions can cause the processor to determine a comfort level of a cabin of the plug-in hybrid electric vehicle and to initiate a preconditioning phase to condition the cabin to the comfort level with electricity from the detected recharging station. Based on the determined comfort level, the computer readable instructions can cause the processor to initiate a heating/defrost system to pre-heat the cabin to the comfort level or an air conditioning system to pre-cool the cabin to the comfort level, during the preconditioning phase.

One of the advantages and features of the embodiments is the Just-in-Time strategy for optimal rechargeable energy storage device depletion can limit extended driving on a deeply discharged rechargeable energy storage device. Another advantage can be the Just-in-Time strategy can reduce or eliminate deep-discharge cycles when the straight-line distance and/or actual distance is not within a limited distance requirement of the vehicle rechargeable energy storage device. Another advantage can be that the plug-in hybrid electric vehicle and the vehicle controller can initiate the Just-in-Time strategy automatically without operator input to accommodate the unsophisticated operator. Furthermore, the plug-in hybrid electric vehicle and the vehicle controller can run the Just-in-Time strategy preferably without, or with, a navigation system and/or GPS to decrease the costs associated with the navigation equipment, and to maintain the Just-in-Time strategy during periods of remote travel where GPS signals tend to be erratic and/or fade during periods of equipment failure.

The above, as well as other advantages of the present invention, will become readily apparent to those skilled in the art from the following detailed description of a preferred embodiment when considered in the light of the accompanying drawings.

BRIEF DESCRIPTION OF THE DRAWINGS

FIG. 4A is a flow chart of a Just-in-Time strategy for depleting a rechargeable energy storage device of a plug-in hybrid electric vehicle using a straight-line calculation routine.

FIG. 4B is a flow chart of a Just-in-Time strategy for depleting a rechargeable energy storage device of a plug-in hybrid electric vehicle using a straight-line calculation routine.

FIG. 5C is a graph explaining one embodiment of the Just-in-Time strategy, using the orientation point and the plurality of destination points of FIGS. 5A and 5B, and depicting one route.

FIG. 5D illustrates a portion of the map of FIG. 5A, depicting the one route of FIG. 5C, a round trip from the orientation point (A) to a destination point B.

DESCRIPTION OF PREFERRED EMBODIMENTS

Figure 1A:
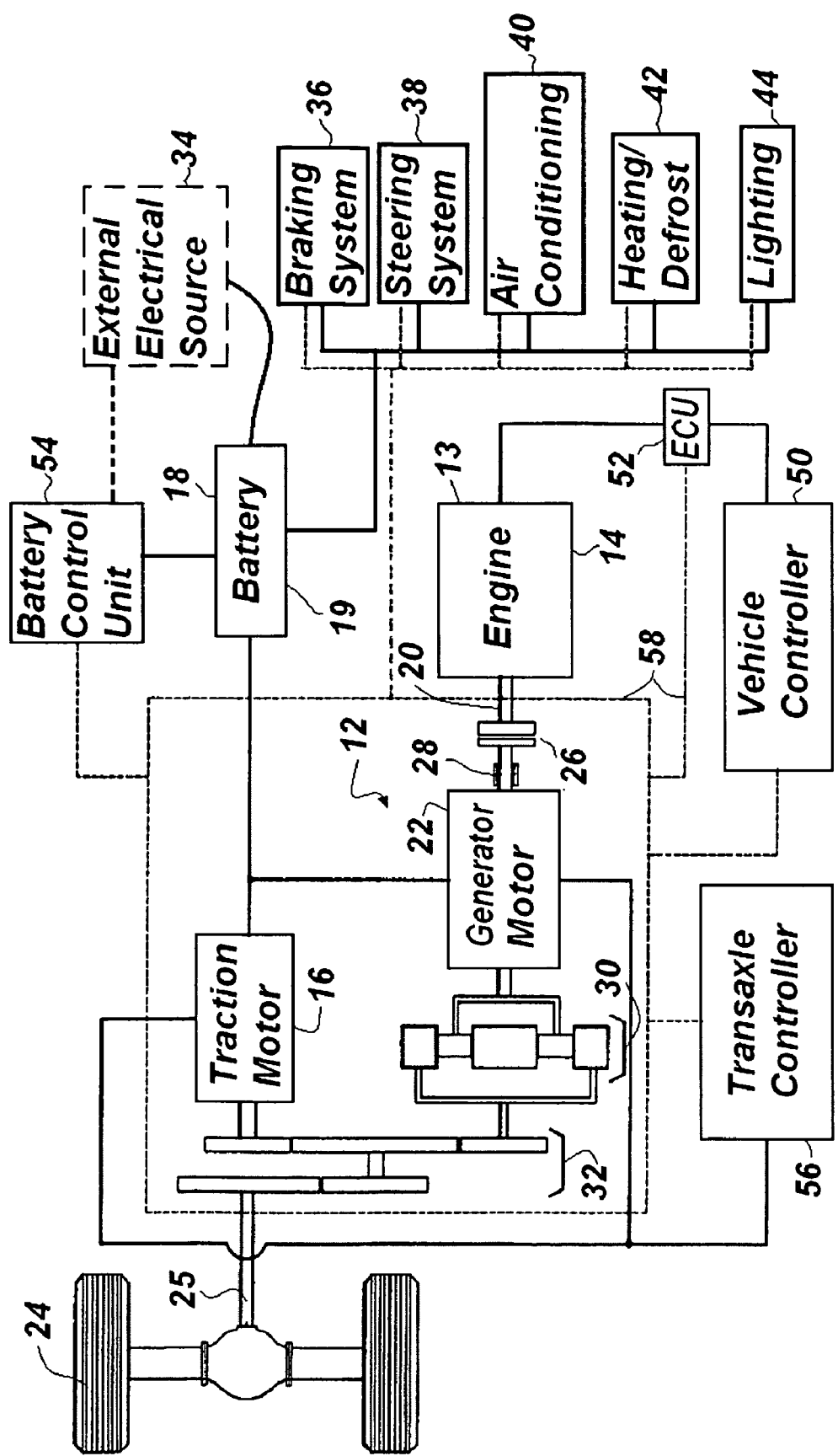
FIG. 1A is a block diagram showing structure of a parallel plug-in hybrid electric vehicle.
Figure 1B:
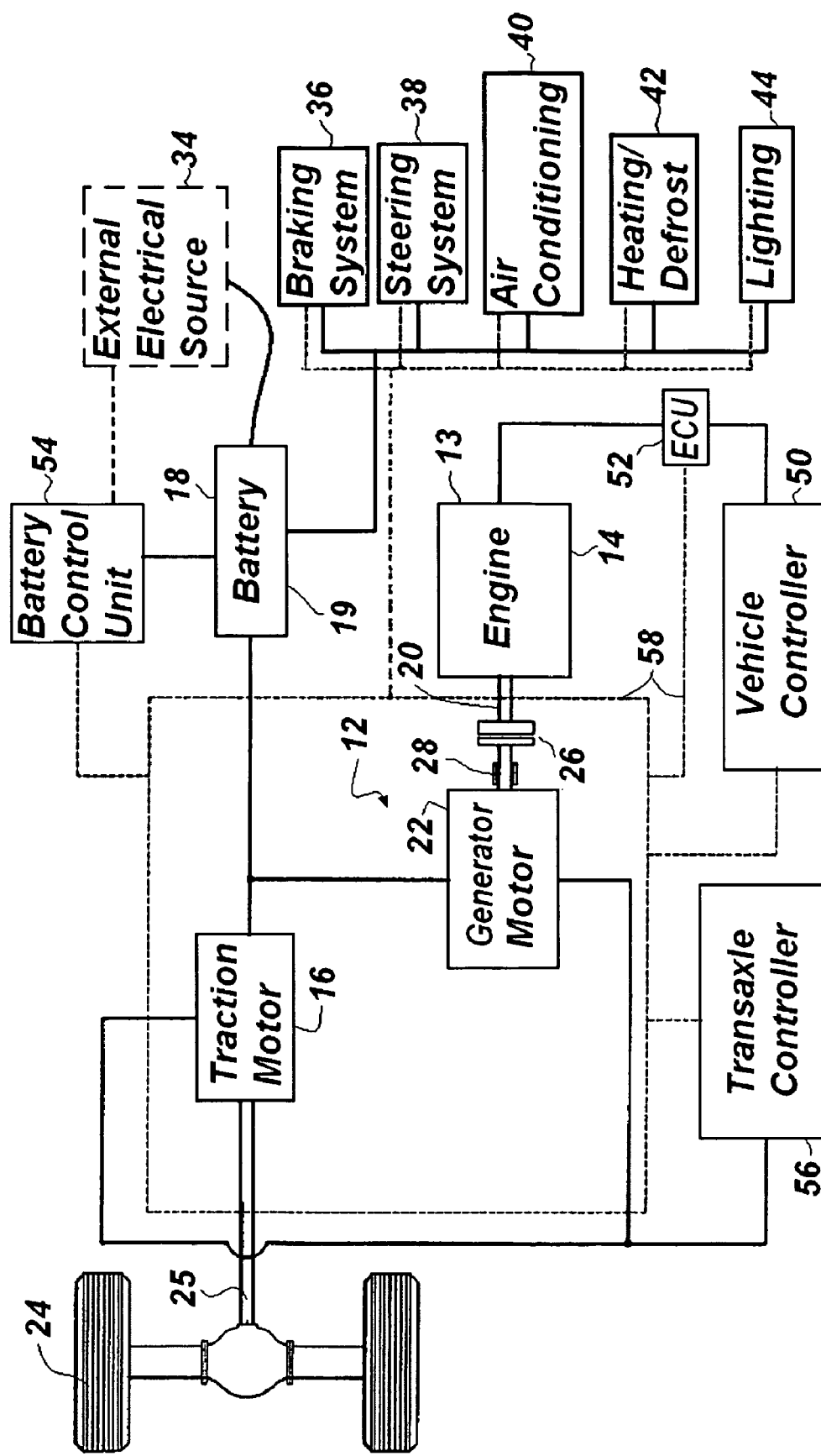
FIG. 1B is a block diagram showing structure of an all-electric drive hybrid electric vehicle.

Referring to the drawings, wherein like reference numerals refer to like components, there are shown in FIGS. 1A and 1B schematic illustrations of an example plug-in hybrid electric vehicle 10 with an exemplary drive train 12. The drive train 12 can be driven by a consumable fuel powered means 13, an electric traction motor 16 powered by a rechargeable energy storage device 18, or both. The consumable fuel powered means 13 can by any engine 14 powered by gasoline, diesel, ethanol, natural gas, hydrogen or another combustible fuel which may be an internal combustion engine (ICE), a hydrogen fuel cell or other alternative consumable-fuel-based power unit. The plug-in hybrid electric vehicle 10 is one example of a vehicle and any other type of vehicle with generally similar functionality would be included.

One example of the plug-in hybrid electric vehicle 10 is an extended range electric drive hybrid electric vehicle (E-REV) shown in FIG. 1B. The engine 14 of the E-REV can be mechanically connected via a shaft 20 to the generator motor 22, which in turn, provides energy to the rechargeable energy storage device 18. In the E-REV, the traction motor 16 provides the sole source of torque to wheels 24 via an output shaft 25. Another example of the plug-in hybrid electric vehicle 10 is a parallel hybrid electric vehicle shown in FIG. 1A. The engine 14 and the traction motor 16 can each work together in varying degrees to provide torque to the vehicle wheels 24 via the output shaft 25. The generator motor 22 of the parallel hybrid electric vehicle can be used to charge the rechargeable energy storage device 18 from the power produced by the engine 14. In one example, a clutch 26 of the parallel hybrid electric vehicle can engage and disengage the engine 14 from the generator motor 22, and the shaft 20 can also be mechanically linked to a generator brake 28. The engine 14 of the parallel hybrid electric vehicle can drive the vehicle wheels 24, when the clutch 26 is engaged, via a set of planetary gears 30 and a second gear set 32. In another example of parallel hybrid electric vehicles there is no clutch 26 and the engine is connected directly to the gear set. The illustrated drive trains 12 of the plug-in hybrid vehicles 10 are merely examples intended to include other variations of plug-in hybrid electric vehicle drive trains 12 known to one of ordinary skill in the art.

The rechargeable energy storage device 18 can be charged by the generator motor 22 when the consumable fuel powered means 13 is running, as previously mentioned, and/or by an external electrical source 34. The external electrical source 34 can be a conventional house current and voltage, such as a 110 VAC source or any external source of electric power operating at a predetermined voltage that is compatible with the power system of the vehicle 10. The rechargeable energy storage device 18 can also be charged regeneratively through a regenerative means, such as energy recovered when braking, coasting, or any other means known in the art. The rechargeable energy storage device 18 can be an electrochemical battery, such as a lithium-ion battery or a nickel-metal hydride battery, a high-power capacitor, such as an ultra capacitor(s), or a combination of different examples of these storage technologies. In other examples, the rechargeable energy storage device 18 can be any other mechanism or device capable of receiving, storing, and discharging electrical energy. The rechargeable energy storage device 18 will now be referred to generally as a battery 19, which is intended to encompass all forms of rechargeable energy storage devices. The use of a plurality of uniform rechargeable energy storage devices or diverse rechargeable energy storage devices is possible.

Vehicles 10 are further provided with a braking system 36 for slowing the vehicle 10 and a steering system 38 for controlling the movement of the vehicle 10. The braking system 36 and the steering system 38 can be operated with an actuator driven by electric power from the battery 19. Furthermore, it is common for vehicles 10 to have an air conditioning system 40, a heating system with defrost 42, and a lighting system 44, each operated with actuators driven by electric power from the battery 19. The air conditioning system 40 typically has a cabin temperature adjusting function, a ventilating function, a heat exchange function, and an air cooling function to control the comfort of the vehicle 10 inside the passenger cabin.

Also illustrated in FIGS. 1A and 1B is an example of a control system for the vehicle 10. The control system can include one or more general vehicle controllers, such as a vehicle controller 50, an engine control unit (ECU) 52, a battery control unit (BCU) 54 and/or a transaxle controller 56. The vehicle controller 50 can control many components in the vehicle 10 by connecting to each component through a communication network such as a controller area network (CAN)

58, which is represented by the dashed lines. Although illustrated as a single vehicle controller in FIGS. 1A and 1B, the vehicle controller 50 may include any number of controllers that execute various functions of the vehicle 10 or modules that are software or instructions to perform the various functions of the vehicle 10. All vehicle controllers can be physically combined in any combination or can stand as separate units. The vehicle controllers are illustratively described as separate units here to describe different distinct functionality. The ECU 52 can connect to the consumable fuel powered means 13 via a hardwire interface or other communication means. The vehicle controller 50 can communicate with the ECU 52, as well as the BCU 54 and the transaxle controller 56. The BCU 54 connects to the battery 19 via a hardwire interface or other communication means. The transaxle controller 56 can control the generator motor 22 and/or the traction motor 16 via a hardwire interface or other communication means.

Figure 2:
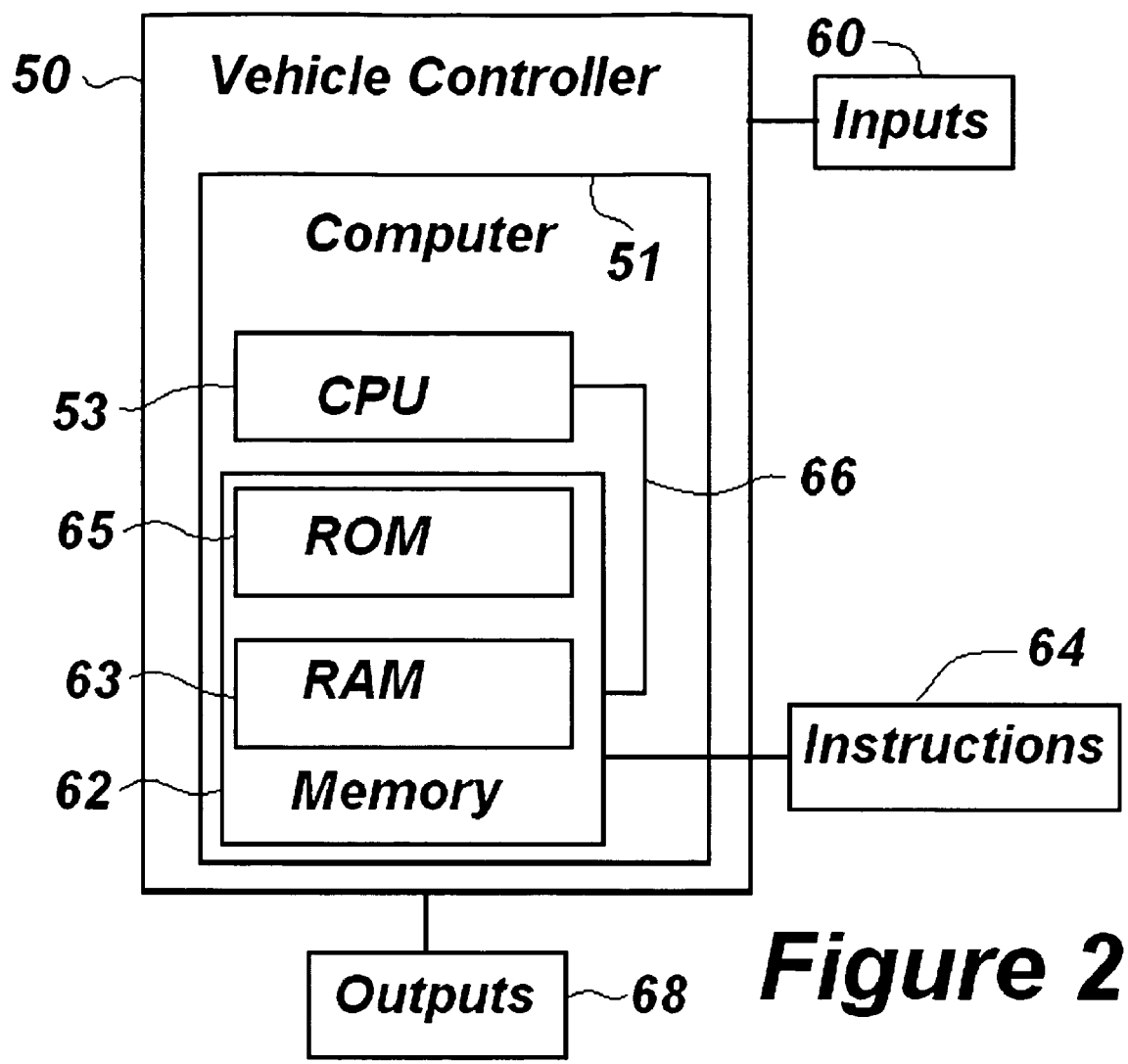
FIG. 2 is a perspective view conceptually showing the usage of a vehicle controller shown in FIGS. 1A and 1B.

Referring to FIG. 2, the vehicle controller 50 preferably includes at least one computer 51 having at least one processor or CPU 53 and inputs 60. Instructions 64 stored in memory 62 can include instructions for detecting present characteristics of the vehicle 10. An illustrative, but not exhaustive, list of data illustrated as inputs 60 includes a battery state-of-charge (SOC), electric flows into and out of the battery 19, a vehicle speed, a throttle position, a brake pedal position, a vehicle acceleration/deceleration, an odometer distance, a steering wheel turning angle, a drive train speed, a wheel speed, a wheel acceleration, a tire longitudinal force, a tire turning angle, a tire inflation pressure, an angle of inclination of the vehicle, a vehicle load, a passenger cabin temperature, an ambient temperature, an engine/motor temperature, and/or any other measurable parameters of the vehicle 10. The inputs 60 can be signals from vehicle sensors, can be transmitted from an external source, can be predetermined parameters stored in memory 62 in a database, or can even be input manually by an operator. A performance map of the vehicle 10 can be created with the various inputs 60 to define an energy map for any particular trip as the trip proceeds. The memory 62 may be any form of computer useable medium capable of storing instructions 64 and data inputs 60. In FIG. 2, the memory 62 is illustrated generally as including random access memory (RAM) 63 and read-only memory (ROM) 65. Thus, the memory 62 may include volatile and/or non-volatile data storage that can include a magnetic media, and optical disk, flash memory or any other form of data storage device. The memory 62 and the CPU 53 are generally connected via a bus 66. Instructions 64 can be stored in the ROM 65 of the memory 62. The instructions 64 are executed by the CPU 53 to control and make decisions for the vehicle 10 in the form of outputs 68 to direct, monitor, and otherwise functionally cooperate with devices and mechanism included in the vehicle 10. In a preferred embodiment, the execution of the instructions 64 provides outputs 68 that are fully automatic and without any operator input. Optionally, some outputs 68 can be provided to the operator via an in-vehicle user interface, such as audio and/or visual display.

Referring to FIGS. 1A, 1B, and 2, using various types of information and data in the form of inputs 60 from the vehicle 10, the vehicle controller 50 can execute control methods to predict how to control the drive train 12 of the vehicle 10 to achieve particular objectives. One particular objective is the optimization of the depletion of the battery 19 to preserve and extend the lifetime of the battery 19. One form of outputs 68 from the vehicle controller 50 that can be executed by the vehicle controller 50, the transaxle controller 56, or both, includes drive train instructions. Drive train instructions can include propulsion of the vehicle 10 only from the traction motor 16, only from the consumable fuel powered means 13, or from a combination of the traction motor 16 and the consumable fuel powered means 13 in variable ratios. Another form of outputs 68 from the vehicle controller 50 that can be executed by the vehicle controller 50, the BCU 54, or both, includes battery recharging options from the generator motor 22 powered by the consumable fuel powered means 13 and/or from the external electric source 34.

Battery recharging options can be important because the vehicle 10 can more fully utilize the full cycle capability of the battery 19 numerous times during lifetime operation, and as a result, typically require deep battery recharging and discharging cycles. The terms "discharging" and "depleting" and various forms thereof can be used interchangeably to describe the unloading of the battery 19. The battery 19 can have a kilowatt rating and/or a predetermined limited distance requirement 71, such as a 10-mile, 20-mile, 30-mile, etc. The limited distance requirement 71 is a metric to describe the distance of travel by the vehicle 10 with the battery 19 from a fully charged state to a fully discharged state, usually predetermined considering all variables of the vehicle 10. Just like a fuel gauge, the battery 19 has a charge capacity, which is typically referred to as a state of charge (SOC). The battery 19 can also have an instant limited distance requirement which can vary in direct relationship with the instant SOC of the battery 19. For example, if the battery, having the limited distance requirement 71 of 10 miles, is depleted early in the trip to approximately 50% SOC, then the remaining instant limited distance requirement would be 5 miles. Thus, for trips longer than 10 miles, the depletion phase can be divided into two 5-mile segments, one at the beginning of the trip and one at the end, in order to stay at the 50% SOC for as long as possible until the instant limited distance requirement is reached.

Each manufacturer of the vehicle 10 and/or battery 19 provides a desired swing cycle or safe operating range of the battery 19. The swing cycle can vary, generally ranging from about 10% (e.g., 60% to 50% SOC) to about 60% (e.g., 85% to 25% SOC) or more. When referring to the Figures, the SOC varies between the maximum and minimum limits of the swing cycle, which is represented as fully charged at a maximum SOC 72 of 100% SOC and as fully depleted at a minimum SOC 74 of 0%. Generally, the larger the swing cycle there is, the smaller number of total lifetime cycles the battery 19 of the vehicle 10 can obtain.

Furthermore, batteries 19 typically have an optimal SOC 116, such as about 45%-65% SOC, which can optimize the lifetime of the battery 19 when the battery 19 is maintained at the optimal SOC 116. The optimal SOC 116 is some value less than the maximum SOC 72 and greater than the minimum SOC 74. The instant distance requirement can correlate with the optimal SOC 116. It can be desirable for maximizing the life of the battery 19 to initially deplete from the maximum SOC 72 to the optimal SOC 116 and to sustain the optimal SOC 116 for as long as possible before depleting to the minimum SOC 74. Optimal control of discharging cycles of the battery 19 can minimize the amount of driving of the vehicle 10 on the battery 19 at a deeply discharged state, which is one of the factors that lead to a shortened lifetime of the battery 19.

Figure 3A:
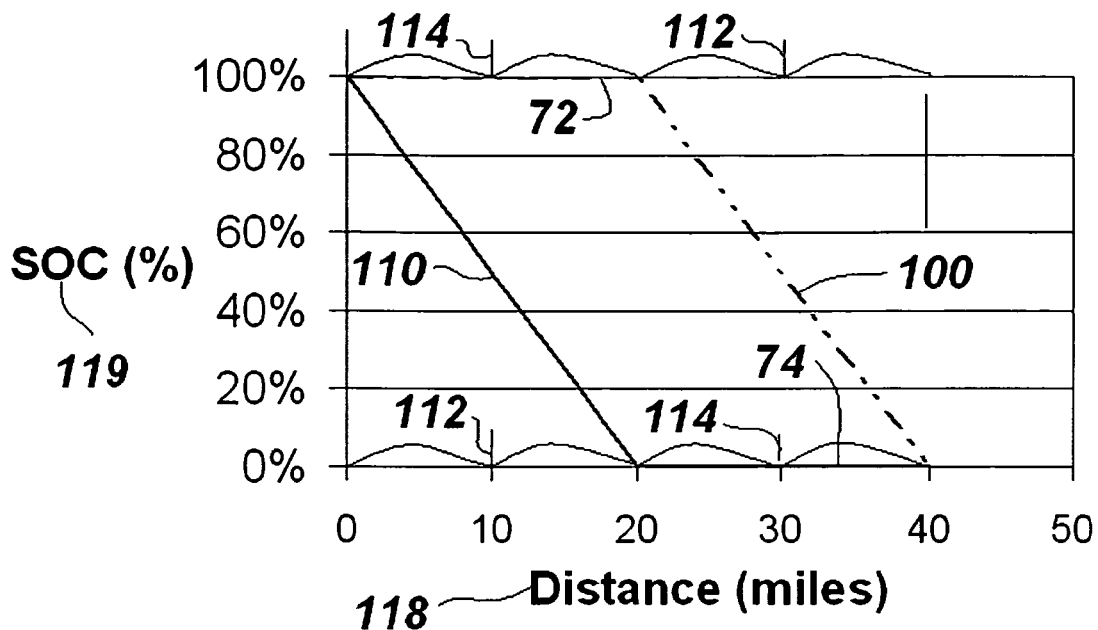
FIG. 3A is a graph illustrating a conventional strategy, and one embodiment of a Just-in-Time strategy, for depleting a rechargeable energy storage device for the vehicle in FIGS. 1A and 1B.

FIG. 3A illustrates one example of optimal battery discharge strategies, describing as a Just-in-Time (JIT) strategy 100 for depleting the battery 19. JIT strategy 100 can maintain the battery 19 at the maximum SOC 72 or the optimal SOC 116, and can permit discharge of the battery 19 to the minimum SOC 74 at the last possible time before recharging at an electric recharging station 102 that has the external electric source 34. The recharging station 102 can be any location having the external electrical source 34, where the vehicle 10 can plug-in to receive electric power to recharge at a predetermined voltage that is compatible with the power system of the vehicle 10. The recharging station 102 can be a stand alone power source or can be connected to an electric grid. Optionally, the battery 19 can be depleted to a higher level than the minimum SOC 74; however, this may not be the most battery efficient strategy. This is because the swing cycle is smaller with the higher SOC than the minimum SOC 74. With a shorter swing cycle, less distance is driven during depletion and less recharging is performed when the vehicle 10 is connected to the recharging station 102, which detracts from some of the advantages. The JIT strategy 100 can be compatible with any vehicle controls.

FIG. 3A is a graph illustrating a strategy 110 for depleting the battery 19 for the vehicle 10 and the JIT strategy 100 for depleting the battery 19 of the vehicle 10. Two phases are shown in both battery discharge strategies 100, 110: (i) a charge depleting phase 112 and (ii) a charge sustaining phase 114. During the charge depleting phase 112, the vehicle 10 can use the consumable fuel powered means 13 and the traction motor 16 to drive the drive train 12 consecutively. In other words, both the consumable fuel powered means 13 and the traction motor 16 are being phased on and off according to the instructions 64 executed by the vehicle controller 50 to generate a predetermined amount of power that may be used to recharge the battery 19. During the charge sustaining phase 114, the vehicle 10, according to the executed instructions 64 of the vehicle controller 50, can use the consumable fuel powered means 13 primarily to drive the drive train 12 and to operate a generator motor 22 for recharging the battery 19 to maintain and sustain a predetermined SOC.

Figure 3B:
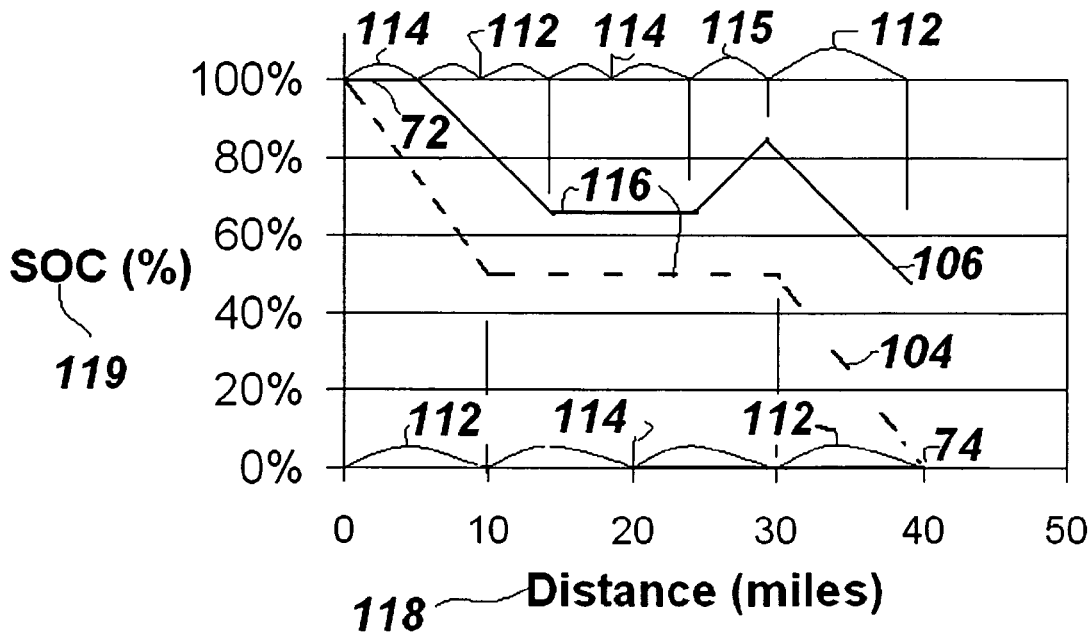
FIG. 3B is a graph illustrating alternative embodiments of the Just-in-Time strategy for depleting the rechargeable energy storage device for the vehicle in FIGS. 1A and 1B.

With reference to FIGS. 3A and 3B, the strategies are shown comparing the distance 118 the vehicle 10 travels and the SOC % 119 of the battery 19 between the maximum and minimum SOC's 72, 74. In FIG. 3A, one strategy 110 for depleting the battery 19 can include initiating the charge depleting phase 112 until the battery 19 is at the minimum SOC 74, which happens to be after 20 miles of distance traveled. Then, the charge sustaining phase 114 can be initiated to maintain the battery 19 at the minimum SOC 74 until the vehicle 10 is recharged at the recharging station 102, after 40 miles of distance traveled. The JIT strategy 100 for depleting the battery 19 in FIG. 3A, on the other hand, can include initiating the charge sustaining phase 114 to maintain the battery 19 at the maximum SOC 72 until a predetermined distance, which happens to be after 20 miles of distance traveled. Then, once the vehicle 10 is within the predetermined distance to a destination point, such as the recharging station 102, the charge depleting phase 112 is initiated until the battery 19 is fully depleted to the minimum SOC 74, after 40 miles of distance traveled. The timing of the battery 19 reaching the minimum SOC 74 can be at the moment of arriving at the recharging station 102. Both strategies 110, 100 reach the same minimum SOC 74, but the JIT strategy 100 results in far less distance driven on a fully depleted battery (i.e., the minimum SOC 74).

FIG. 3B is a graph illustrating other examples of the JIT strategy 100. One alternative example of a JIT strategy 104 illustrates the vehicle controller 50 initiating the charge depleting phase 112 initially to deplete the battery 19 from the maximum SOC 72 to the optimal SOC 116 after 10 miles of distance traveled. Then, the charge sustaining phase 114 is then initiated for a determined distance of 20 miles of distance traveled. The charge depleting phase 112 can then be initiated to deplete the battery 19 from the optimal SOC 116 to the minimum SOC 74 after another 10 miles of distance traveled. Another alternative example of a JIT strategy 106 illustrates the vehicle controller 50 initiating various charge depleting phases 112 and charge sustaining phases 114 similar to the JIT strategy 104, but having a charge recharging phase 115. The charge recharging phase 115 recharges the battery 19 to a determined target SOC, where the battery 19 is storing energy for future use, generally greater than a previously sustained SOC. In some embodiments, it may be possible for the vehicle controller 50 to not only initiate the consumable fuel powered means 13 to drive the drive train 12, but also to operate the generator motor 22 to recharge the battery 19 to the determined target SOC needed to return to the recharging station 102. The examples provided in FIGS. 3A and 3B are only some of the various types of JIT strategies, and other JIT strategies can be practiced in other examples.

FIGS. 4A and 4B are operational flow diagrams to illustrate another aspect of the JIT strategy 100, which is "knowing" where the vehicle 10 is in relation to the recharging station 102. Without knowing in advance a specific route and without the benefit of a navigation system or map database, when the vehicle controller 50 is aware of the location of and distance to the next probable recharging station 102, the vehicle controller 50 can switch from the charge sustaining phase 114 to the charge depleting phase 112.

Referring to FIG. 4A, one way for the vehicle controller 50 to know the location and distance to the next recharging station 102 is through a process 117 for calculating a straight-line distance 120. In one example, the straight-line distance 120 can be calculated without an operator-defined or programmed location, a navigation system, a map database, and/or a GPS. Instead, the vehicle controller 50, using inputs 60 and instructions 64, such as a combination of some of the aforementioned inputs 60, for example, the odometer, vehicle speed, steering wheel angles, RPMs, the transmission gear, can calculate with reasonable accuracy the straight-line distance 120. Alternatively, an inertial navigation sensor, that uses a computer and motion sensors to continuously track direction and speed of a vehicle without the need for external references (hence not requiring any external signals), may be used to calculate the straight line distance 120.

The vehicle controller 50 begins with defining an orientation point 122 of the vehicle 10 (117a). The orientation point 122 can be anywhere, with one example being at the last plug-in recharging station 102. One example of the vehicle controller 50 defining the orientation point 122 is equipping the vehicle controller 50 to detect when the vehicle 10 is plugged-in to the recharging station 102, such as a voltage detection system. The orientation point 122 can be defined by sensing an input indicative of the recharging station 102 and storing the orientation point 122 representative of the geographic location of the recharging station. Next, after the vehicle 10 has moved from the orientation point 122, the vehicle controller 50 can determine a current present location of the vehicle 10 relative to the orientation point 122 (117b). The vehicle controller 50, through inputs 60 and instructions 64, can monitor and track the current present location. The straight-line distance 120 between the orientation point 122 and the current present location can be calculated (117c) by the vehicle controller 50.

In FIG. 4A, the vehicle controller 50 can use another process 119 to monitor and/or estimate the SOC. The SOC of the battery 19 can be calculated by the vehicle controller 50 to estimate the amount of battery capacity needed to return to any recharging station 102, including the orientation point 122 (119a). The SOC of the battery 19 can also be monitored by the vehicle controller 50 (119b).

Referring to FIG. 4B, the vehicle controller 50 through another process 121 can compare the monitored SOC of the battery 19 to the calculated SOC (121a). If the monitored SOC is greater than the calculated SOC, the vehicle controller 50 can initiate the charge depleting mode 112 to the drive train 12 with primarily drive the traction motor 16 and to monitor the battery SOC (121b). The charge depleting mode 112 can occur until the battery 19 is depleted to the calculated SOC. If the monitored SOC is less than the calculated SOC, the vehicle controller 50 can initiate one of several strategies depending on the characteristics of the battery 19. One example can be for the vehicle controller 50 to initiate the charge recharging phase 115 to recharge the battery 19 to the calculated SOC (121c).

Referring to FIG. 4A, the vehicle controller 50 through another process 123 can characterize or determine whether the straight-line distance 120 is increasing or decreasing (123a). When the calculated straight-line distance 120 is increasing from the orientation point 122, the vehicle controller 50 can initiate the charge sustaining mode 114 to substantially sustain the monitored SOC, to continue monitoring the SOC, and/or to initiate the generator motor 22 to recharge the battery 19 (123b). A targeted SOC, whether the optimal SOC 116, the minimum SOC 74, or other SOC, can have a deviation of about 1% or 2%, but can also have a deviation of up to 10% (or possibly more). The deviation can vary depending on the actual route being traveled (for example a twisting mountainous route is more demanding on the vehicle compared to a straight flat route of the same distance) and/or upon individual driver demands on the vehicle (since some drivers drive more aggressively and faster than other drivers, effectively making more power demands on the vehicle drive train for the same route).

When the calculated straight-line distance 120 is decreasing from the orientation point 122, the vehicle controller 50 can initiate the charge depleting mode 112 to primarily drive the traction motor 16 and can monitor the SOC. Using the JIT strategy 100 can permit the battery 19 to deplete to about the minimum SOC 74 when the calculated straight-line distance 120 is about zero (123c). When the calculated straight-line distance 120 remains substantially unchanged, the vehicle controller 50 can revert back to the most recently initiated phase, initiate another phase, including the charge recharging phase 115 (123d). The vehicle controller 50 may continue the process until the calculated straight-line distance 120 is zero (123e). Depending on the limited distance requirement 71 of the battery 19 (i.e., 10-mile, 20-mile, 30-mile, etc.), and the vehicle controller 50 knowing the straight-line distance 120, the vehicle controller 50 can initiate the charge depleting mode 112, when the straight-line distance 120 is within the limited distance requirement 71. It may be unlikely that the JIT strategy 100 with the calculation of the straight-line distance 120 would permit the battery 19 to reach exactly the minimum SOC 74 at the exact moment when the calculated straight-line distance 120 is exactly zero. The tolerance of the straight line distance 120 may vary from 1000 feet to about a mile. However, this does not significantly deter from the overall goal of optimizing the battery depletion, where extended hours and distances on a deeply discharged battery are still substantially avoided.

To elaborate further, the vehicle controller 50 can continuously or intermittently at a predetermined time interval calculate the straight-line distance 120, regardless of possible side trips, and can begin internally to countdown the straight-line distance 120, e.g., ten, nine, eight, seven, six miles away from the orientation point 122. For example, when the straight-line distance 120 of the vehicle 10 is five miles, the vehicle controller 50 can permit the battery 19 to discharge to 40%-50% SOC; when four miles, discharge to 30%-40% SOC, and so forth. As previously mentioned, it is expected that there may be times with the JIT strategy 100 with the straight-line calculation 120, that the battery 19 may be fully depleted to the minimum SOC 74, with there being still a thousand feet, a mile or several miles to go to reach the orientation point 122. This example for knowing the destination may be successful as the JIT strategy 100 need not be as precise as with map based navigation systems. In other words, the benefits and advantages of the JIT strategy 100 are substantially met without the ultra precision of navigation systems, map databases and/or GPS receivers. Additionally, the JIT strategy 100 maximizes the use of stored electricity without need for any input from the driver or operator interface and without need for any voice or visual output to the driver which might require the driver to make specific driving decisions.

In another example, the vehicle controller 50, using the JIT strategy 100, can also estimate an actual distance 125 between the orientation point 122 and the current present location. Much like using the straight-line distance 120 to initiate a phase, as described above, the vehicle controller 50 can initiate one of several phases by using the actual distance 125. The actual distance 125 can be monitored and tracked by the vehicle controller 50, using a combination of some of the aforementioned inputs 60, such as the odometer, vehicle speed, steering wheel angles, RPM's, the transmission gear, etc. On the other hand, the vehicle 10 may have a global positioning system (GPS) receiver to define the actual current present location of the vehicle 10, allowing the vehicle controller 50 to calculate the actual distance 125. In another example, the vehicle 10 may have a map based navigation system with GPS capability to define the current present location of the vehicle 10, allowing the vehicle controller 50 to calculate the actual distance 125.

In another example of the JIT strategy 100, the vehicle controller 50 may then compare the actual distance 125 with the calculated straight-line distance 120. If the actual distance 125 is increasing or decreasing, and the calculated straight-line distance 120 remains substantially unchanged, then the vehicle controller 50 can revert back to the most recently initiated phase or initiate another phase, including the charge recharging phase 115. If the actual distance 125 is within the limited distance requirement 71, instead of the straight-line distance 120, the vehicle controller 50 can initiate the charge depleting mode 112. In this scenario, it is foreseeable that the actual distance 125 may be 2 to 10 times or more greater than the straight-line distance 120, and the initiation of the charge depleting phase 112 can be delayed until the actual distance 125 is within the limited distance requirement 71 of the battery 19.

The vehicle controller 50 can know where the vehicle 10 is in relation to the recharging station 102. In one example, the vehicle controller 50 can know by sensing and storing the location of the recharging station 102 in memory 62 when used. The geographic location of the recharging station 102 can also be known through inputs 60 defined by an operator-defined location, a navigation system, global positioning system (GPS), or a map database. The vehicle controller 50 can define locations by assigning a latitude, longitude, and/or elevation using GPS. The straight-line distance 120 and/or the actual distance 125 between the current present location and a likely recharging station 102 can be calculated with the aid of using the navigation system, map database, and/or GPS.

Combining information of both the straight-line distance 120 and the probable actual distance 125 may result in calculating continuously (or stepped) variable SOC targets along the route that are intermediate between the SOC targets for just one method or the other method alone, thereby offering more options for the vehicle controller 50 and the vehicle 10.

Another example can be for the vehicle controller 50 to initiate the charge recharging phase 115 to recharge the battery 19 to a determined target SOC based on a boundary requirement of a destination point 134. The boundary requirement is a distance surrounding the destination point 134 where internal combustion engine emissions or pollution within the boundary requirement is prohibited. Some regulatory bodies provide disincentives to vehicle emissions or pollutions, such as taxes. Thus, the determined target SOC is the amount of SOC for the vehicle 10 to enter and leave the boundary requirement of the destination point 134 without using the consumable fuel powered means 13. Another example can be for the vehicle controller 50 to initiate to the charge sustaining phase 114 to substantially sustain the SOC, and to determine whether the straight-line distance 120 and/or actual distance 125 is increasing, decreasing, or unchanging. If the monitored SOC is substantially equal to the calculated SOC within plus or minus 5%, then the vehicle controller 50 can determine whether the straight-line distance 120 and/or actual distance 125 is increasing, decreasing, or unchanging.

Figures 5A, 5B:
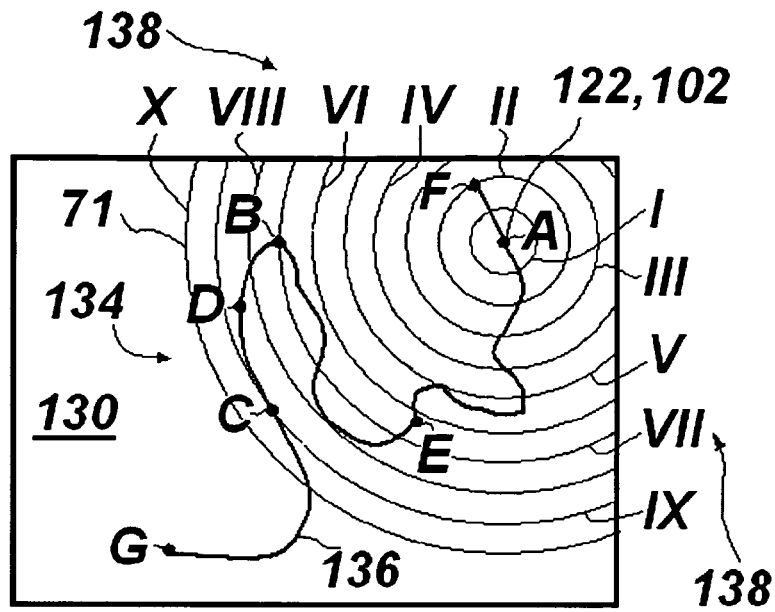
FIG. 5A illustrates a portion of a map containing an orientation point, a plurality of destination points, a road segment, and a plurality of destination circles incremented at a predetermined interval.
FIG. 5B is a table of, respectively, destination points, total actual mileage and straight-line distance from an orientation point A, with reference to FIG. 5A.

FIGS. 5A-5F illustrate several scenarios of the vehicle 10 using one example of the JIT strategy 100. FIG. 5a illustrates a portion of a map 130 containing the orientation point 122 represented also by A that is a geographic location of the recharging station 102. In addition, a plurality of potential destination points 134, generally reference by B, C, D, E, F, G, a road segment 136, and a plurality of destination circles 138 incremented at predetermined intervals. In this example, the plurality of destination circles 138 are incremented for every mile for a total of 10 miles, represented by roman numerals I (1 mile), II (2 miles), III (3 miles), IV (4 miles), V (5 miles), VI (6 miles), VII (7 miles), VIII (8 miles), IX (9 miles), and X (10 miles), are illustrated. The X destination circle 138 is illustrative of the limited distance requirement 71 of a 10-mile battery 19 using the calculation method of straight-line distance 120. FIG. 5B is a table of the respectively, the destination points 134, the total actual mileage 125 from the orientation point 122 (A) to the respective destination point 134 along the road segment 136, and the straight-line distance 120 from the orientation point 122 (A) to the respective destination point 134.

FIG. 5C is a graph explaining the JIT strategy 100, using destination points 134, A, B, C, D, E, F, G, and one route 140a, with reference to FIGS. 5A-5D. The first route 140a is illustrated in FIG. 5D and is an example a round trip from the orientation point 122 (A) to another destination point B using a vehicle 10 with the 10-mile battery 19, or battery 19 with the limited distance requirement 71 of 10 miles.

Referring to FIGS. 5B-5D, the destination point B has the actual total distance 125 of 16 miles from the orientation point 122 (A) (round trip distance of 32 miles) and a straight-line distance 120a of 7 miles. While traveling to destination point B, the vehicle 10 initially travels to and eventually passes destination point E. The vehicle controller 50 determines that the straight-line distance 120 and/or the actual distance 125 is increasing (the vehicle is going in a general direction 142a away from the first destination point A). Since the instant limited distance requirement (in this example a SOC % 119 of 50%, which happens to also be the optimal SOC 116) of the battery 19 is initially greater than the straight-line distance 120 from point A for most of the distance 118 while traveling to point E, the vehicle controller 50 initiates the charge depleting phase 112, reducing the battery SOC 119 to a target SOC, typically the optimal SOC 116. The vehicle controller 50 continues the charge depleting phase 112 until such time as the instant limited distance requirement of the battery 19 equals the straight-line distance 120 and/or the actual distance 125 from point A. The vehicle controller 50 can then determine that the straight-line distance 120a and/or the actual distance 125 is increasing (the vehicle 10 is still going in a general direction 142a away from the first destination point A). The vehicle controller 50 can initiate the charge sustaining phase 114 when outside or greater than the instant limited distance requirement of the battery 19. The vehicle controller 50 can also initiate the charge depleting phase 112 when inside or less than the instant limited distance requirement of the battery 19.

When first traveling to the destination point B, the vehicle controller 50 may or may not know that destination point B has the recharging station 102. If destination point B has the recharging station 102, the vehicle controller 50 can "remember" and store that information for the next time the vehicle 10 is on the route containing destination point B. Assuming destination point B is not the recharging station 102, on the return trip to the orientation point 122 (A), the straight-line distance 120a and/or the actual distance 125 can be calculated by the vehicle controller 50. The vehicle controller 50 can determine whether the distance, straight-line distance 120a and/or the actual distance 125, to the orientation point 122 is decreasing and/or within or less than the limited distance requirement 71 of the battery 19. The vehicle controller 50 can initiate the charge depleting phase 112 when either the straight-line distance 120a or the actual distance 125 is within the remaining the limited distance requirement 71 of 5 miles (equivalent to the SOC % 119 of 50% that was previously sustained during the charge sustaining phase 114), as already described herein. In the instant example, the vehicle controller 50 may begin depleting to 50-40% SOC in anticipation of reaching the straight-line distance 120a or the actual distance 125 of 5.0 miles, or whatever SOC % that the vehicle controller 50 estimates to arrive at the orientation point 122 (A) with the minimum SOC 74. This trip can be indicative of a daily routine trip, such as from home to work and back to home, when the home has the recharging station 102.

Figures 5E, 140B:
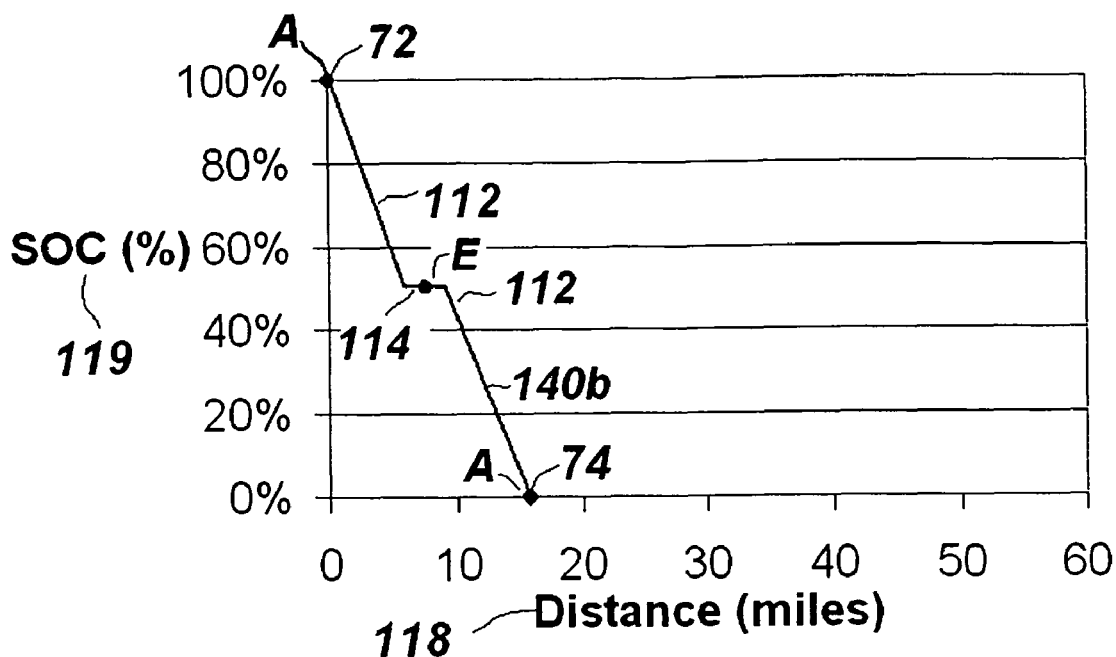
FIG. 5E is a graph explaining one embodiment of the Just-in-Time strategy, using the orientation point and the plurality of destination points of FIGS. 5A and 5B, and depicting one route.
Figure 5F:
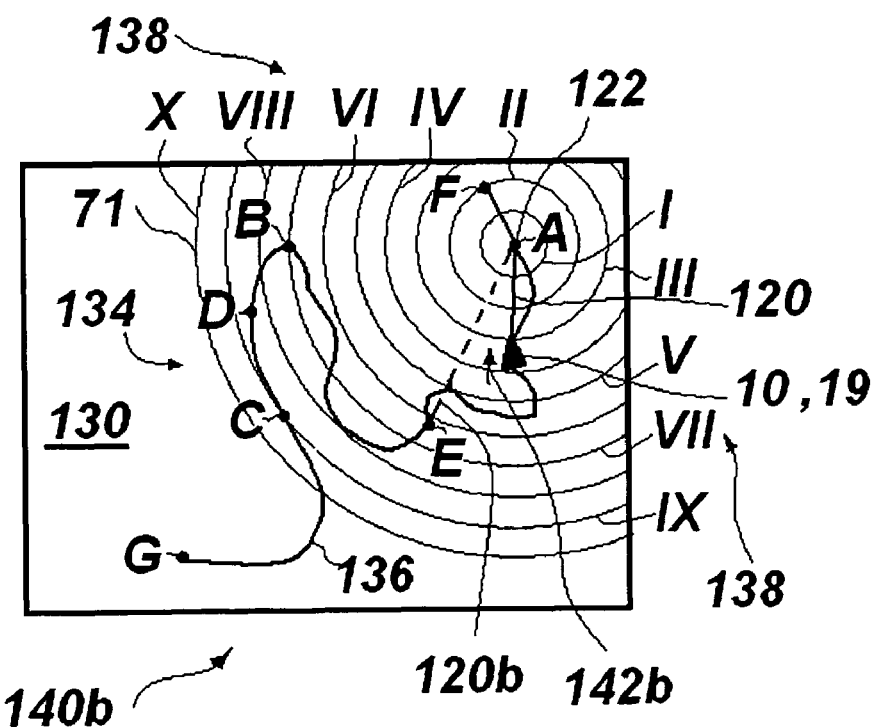
FIG. 5F illustrates a portion of the map of FIG. 5A, depicting the one route of FIG. 5E, a round trip from the orientation point (A) to a destination point E.

FIG. 5E is a graph explaining the JIT strategy 100, using destination points 134, A, B, C, D, E, F, G, and one route 140b, with reference to FIGS. 5A, 5B, 5E, and 5F. The second route 140b is illustrated in FIG. 5F and is an example a round trip from the orientation point 122 (A) to another destination point E using a vehicle 10 with the 10-mile battery 19, or battery 19 with the limited distance requirement 71 of 10 miles.

Referring to FIGS. 5B, 5E, and 5F, the destination point E has the actual distance 125 of 8 miles from the orientation point 122 (A) (round trip distance of 16 miles) and a straight-line distance 120b of 6.2 miles. While traveling to destination point E, the vehicle controller 50 can determine that the straight-line distance 120b and/or the actual distance 125 is increasing or decreasing (the vehicle 10 is still going in a general direction 142b toward the first destination point A). The vehicle controller 50 can initiate the charge depleting phase 112 when inside or less than the instant limited distance requirement of the battery 19. The vehicle controller 50 can initiate the charge sustaining phase 114 when outside or greater than the instant limited distance requirement of the battery 19. The vehicle controller 50 can determine whether the distance, straight-line distance 120b and/or the actual distance 125, to the orientation point 122 is decreasing and/or within the instant limited distance requirement of the battery 19. The vehicle controller 50 can initiate the charge depleting phase 112 when either the straight-line distance 120b or the actual distance 125 is within the instant limited distance requirement of 10 miles, as already described herein. The route 140b is much shorter than the route 140a, thus during substantially the entire trip, except for distance 118 of 7-9 miles, which can vary from route to route, the vehicle controller 50 is initiating the charge depleting phase 112.

This example illustrates the JIT strategy 100 when traveling a short trip to a destination point 134 on the same route of a stored location with the recharging station 102, for example, the destination point B. This trip can be indicative of a weekend non-routine trip, such as from home to the grocery and back to home. Assuming the destination point B is the recharging station 102, the vehicle controller 50 then would determine if the straight-line distance 120b and/or the actual distance 125 is closer to either the orientation point 122 (A) or to destination point B, both having the recharging stations 102. Whichever is closer, the vehicle controller 50 would use that particular location as the relative point to calculate the straight-line distance 120b and/or the actual distance 125.

Figures 5G, 140C:
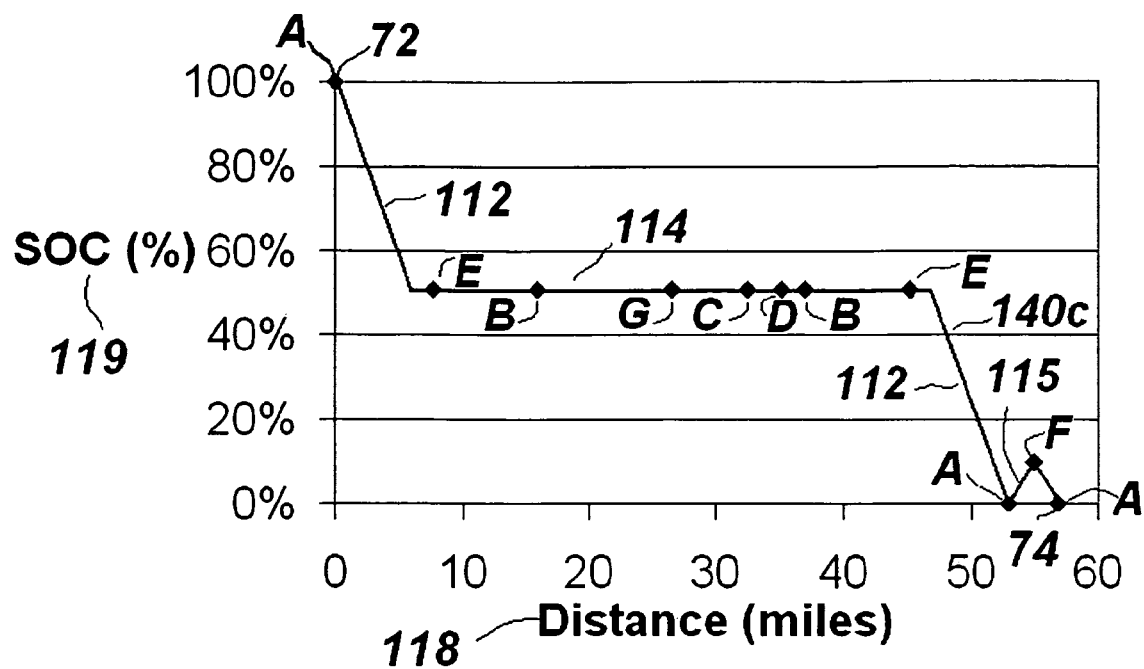
FIG. 5G is a graph explaining one embodiment of the Just-in-Time strategy, using the orientation point and the plurality of destination points of FIGS. 5A and 5B, and depicting one route.
Figure 5H:
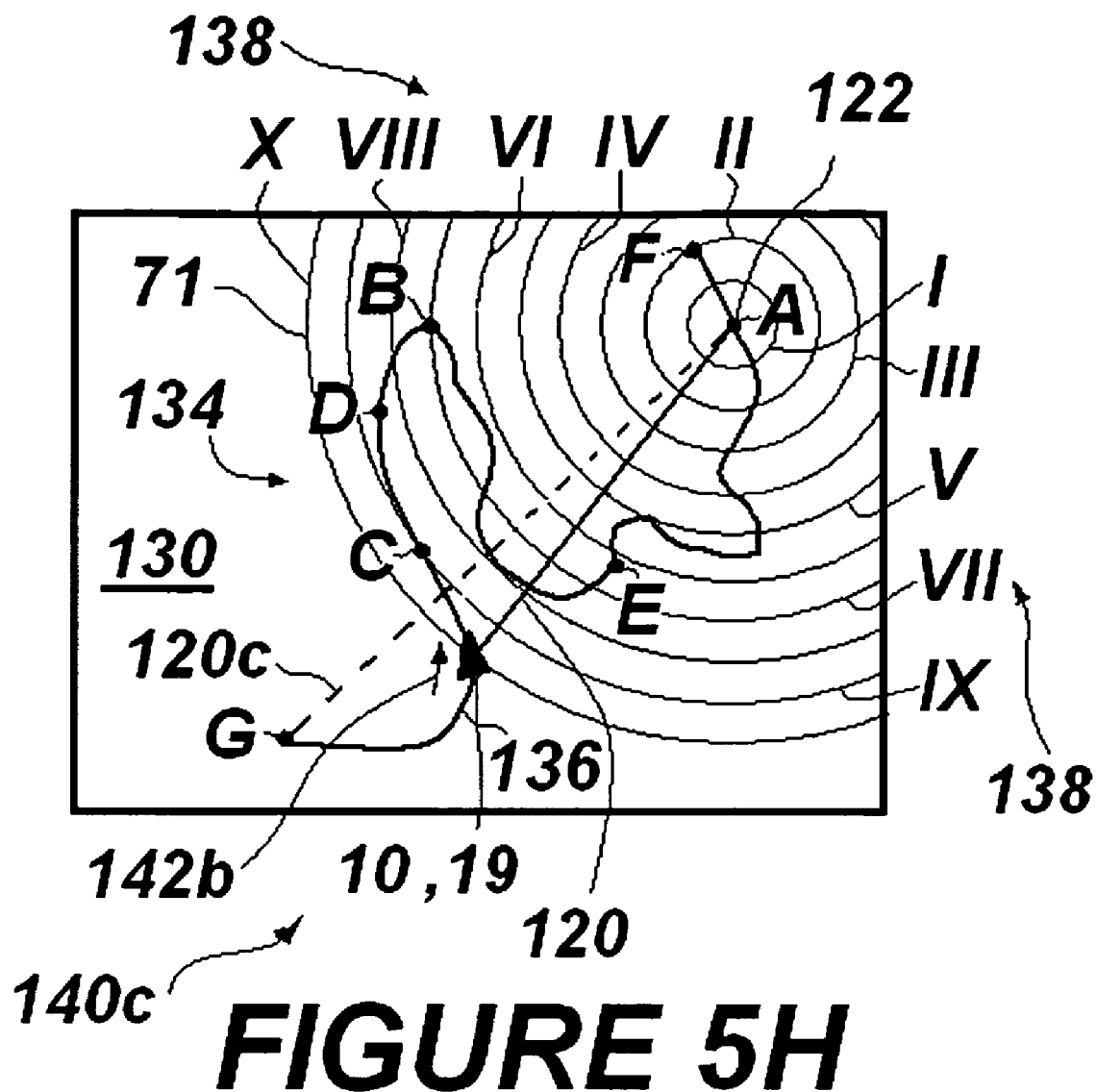
FIG. 5H illustrates a portion of the map of FIG. 5A, depicting the one route of FIG. 5G, a round trip from the orientation point (A) to a destination point G.

FIG. 5G is a graph explaining the JIT strategy 100, using destination points 134, A, B, C, D, E, F, G, and one route 140c, with reference to FIGS. 5A, 5B, 5G, and 5H. The third route 140c is illustrated in FIG. 5H and is an example a round trip from the orientation point 122 (A) to another destination point G using a vehicle 10 with the 10-mile battery 19, or battery 19 with the limited distance requirement 71 of 10 miles.

Referring to FIGS. 5B, 5G, and 5H, the destination point G has the actual distance 125 of 26.5 miles from the orientation point 122 (A) (round trip distance of 53 miles) and a straight-line distance 120c of 14 miles. The straight-line distance 120c of 14 miles is only illustrative, and can be any distance greater than the limited distance requirement 71 battery 19. This trip can be indicative of any non-routine trip with multiple destination points 134 (E, B, C, C, D, B, E), with at least one destination point being outside or greater than the instant limited distance requirement of the battery 19. While traveling toward the destination point G, the vehicle controller 50 can determine that the straight-line distance 120c and/or the actual distance 125 is increasing to more than the limited distance requirement 71, and can initiate the charge sustaining phase 114. On the return trip from the destination point G to the orientation point 122 (A), with multiple destination points 134 along the return trip, the straight-line distance 120c calculated by the vehicle controller 50 at the destination point G is 14 miles (which is greater than the nominal 10-mile standard of the battery 19 and also greater than the instant limited distance requirement of 5 miles). The vehicle 10 can substantially sustain the charge sustaining phase 114 until it enters the instant limited distance requirement represented by the destination circle 138 (V) of 5 miles somewhere in between destination points E and A. After the vehicle controller 50 calculates the straight-line distance 120c of less than 5 miles, the vehicle controller 50 can initiate the charge depleting phase 112 to begin depleting the battery 19.

On the other hand, the vehicle 10 can substantially sustain the charge sustaining phase 114 until the vehicle 10 has the actual distance 125 substantially equal to the instant limited distance requirement. After the vehicle controller 50 calculates the actual distance 125 of less than 5 miles, the vehicle controller 50 can initiate the charge depleting phase 112 to begin depleting the battery 19. In FIG. 3C, a flattened slope, e.g., between the destination points B and E, means that the actual distance 125 traveled is great without very much decrease in straight-line distance 120. A steep slope, e.g., between the destination points E and F, means that the actual distance 125 traveled is substantially equally to the straight-line distance 120.

Another embodiment of the JIT strategy is also shown, referring to FIGS. 5B, 5G and 5H, with reference to trip 140c, when the vehicle 10 bypasses the recharging station 102. Instead of arriving at the orientation point 122 (A), where the battery SOC % 119 is expected to be about fully depleted to the minimum SOC 74, and recharged, the vehicle 10 travels to the destination point F. The destination point F has the actual distance 125 of 2 miles from the orientation point 122 (A), and has the straight-line distance 120 of 2 miles. While traveling toward the destination point F, the vehicle controller 50 determines that the straight-line distance 120 and/or actual distance 125 is decreasing, and then at some point begins increasing. The JIT strategy 100 can perform one of several options, depending on the sophistication of the JIT strategy 100, when bypassing a known recharging station 102. In one aspect, the vehicle controller 50 can initiate the charge sustaining phase 114, maintaining the battery 19 at the minimum SOC 74. Optionally, the vehicle controller 50 can initiate the charge recharging phase 115, where the battery SOC % 119 can be increased to the optimal SOC 116 or some other predetermined SOC % that is proportional to the distance needed to reach the next closest recharging station 102.

One of the objectives of the JIT strategy 100 is to instruct the vehicle 10 how to use as much as possible propulsion from the traction motor 16 powered by the battery 19 to reach the recharging station 102, while maintaining as close to an optimal SOC as possible along the route so as to arrive at the recharging station 102 at the minimum SOC 74. Consequently, most of the distances traveled with the vehicle 10 are on the battery 19, during the intermediate more optimal SOC range for long battery life, thus avoiding extended driving while the battery 19 is at the minimum SOC 74. This can maximize the amount of energy extracted from the battery 19 during route between recharging stations 102 while helping preserve the effective life of the battery 19. In addition, the costs of possibly having to replace high priced batteries during the normal lifetime of the vehicle 10 may be avoided. By reducing the distance driven on a deeply discharged battery and by reducing the number of deep discharge cycles the battery 19 will experience, the lifetime of the battery 19 can be effectively increased relative to the distance driven by the vehicle 10. Additionally, operating costs can be decreased by charging the battery 19 with electricity, which will minimize the use of the generally more expensive scarce fossil fuels (gasoline, diesel) for the vehicle 10, which maximizes the use of electricity as an external fuel source.

Figure 6:
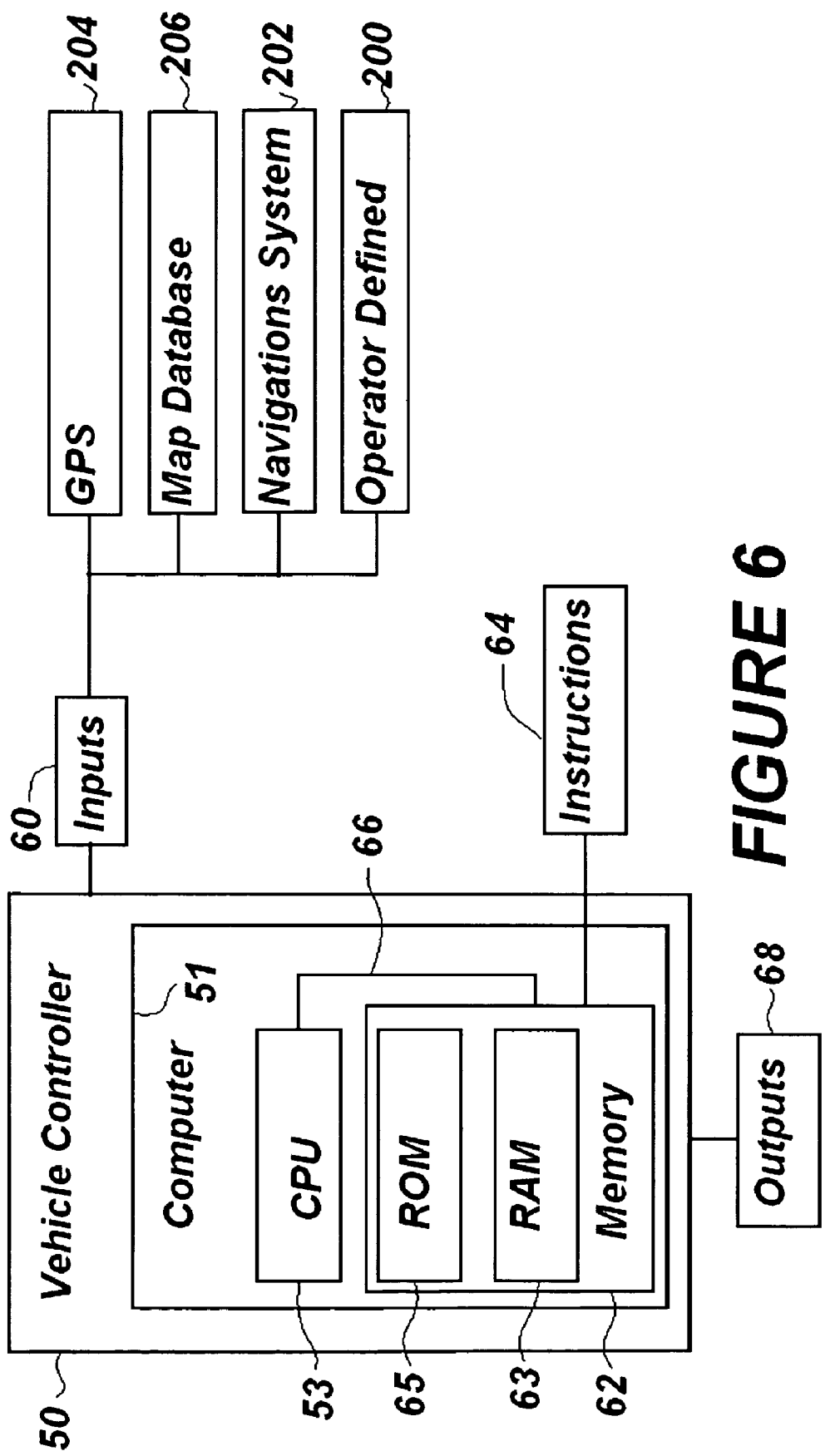
FIG. 6 is a perspective view of the vehicle controller shown in FIGS. 1A and 1B, depicting a GPS, a navigation system, a map database, and operator defined inputs.

In another example, the vehicle controller 50 can know whether the destination point 134 has a recharging station 102. Referring to FIG. 6, an operator defined 200 location, a navigation system 202, a GPS receiver 204, and/or a map database 206 can be used in the vehicle 10 to determine the availability of the recharging station 102. The navigation system 202 can calculate the current present location, or the vehicle geographical position, by receiving signals from various sensors, namely, a gyro sensor, the GPS receiver 204, and a vehicle sensor. The navigation system 202 generally has map data stored in the map database 206 that is configured to guide the vehicle 10 along a route, including the current present location. The navigation system 202 may send a display signal to the display of a graphical user interface (GUI).

The navigation system 202 can also calculate the actual distance 125 to the recharging station 102, both previously used and potentially new ones.

Additionally, the navigation system 202 and/or the GPS receiver 204 can be detachable from or selectively removably attached to the vehicle controller 50. In this example, the navigation system 202 and/or the GPS receiver 204 can connect to the vehicle 10 through a mobile device mount or cable plug-in, which both are configured to connect to the vehicle controller 50 via a communication link. The vehicle controller 50 can detect whether the navigation system 202 and/or the GPS receiver 204 are connected and in communication with the vehicle controller 50. If the navigation system 202 and/or the GPS receiver 204 are attached, the vehicle controller 50 can use the navigation system 202 and/or the GPS receiver 204 to calculate the actual distance 125. If the navigation system 202 and/or the GPS receiver 204 are detached, the vehicle controller 50 can still use the straight-line distance 120 without the navigation system 202 and/or the GPS receiver 204, as described herein.

Information regarding actual location can be available to the vehicle controller 50 as one of many inputs 60. For example, the navigation system 202 can store location information in the memory 62 and remember previous routes and recharging stations 102 without any user input. On the other hand, the user can enable the navigation system 202 to remember locations of recharging stations 102 and can even give such locations operator defined 200 names and/or a symbol. The operator would typically define an origination and a destination at the start of a trip. Using the navigation system 202, GPS receiver 204, and/or the map database 206, the vehicle controller 50 can determine not only the actual distance 125 and contour to be transversed to get to the defined destination, but also where the next probable recharging stations 102 are located. Optionally, two-way communication, for example radio frequency, between a transmitter at the recharging station 102 and a receiver of the vehicle 10 could provide additional recharging station 102 locations to the vehicle controller 50. Given this information, the vehicle controller 50 could initiate the charge depleting phase 112 of the JIT strategy 100 to use the consumable fuel powered means 13 as little as possible to arrive at each potential recharging station 102 with the battery 19 at the minimum SOC 74. In this example, the battery 19 can become fully depleted within about 100 feet of the destination that has the recharging station 102, depending on the accuracy and tolerances of the GPS receiver 204, which is much more precise than the straight-line calculation 120 discussed herein. In another example, the vehicle controller 50 can determine the actual distance 125 using the GPS receiver 204 without the navigation system 202, and can store information related to GPS locations into the memory 62.

Since date and time information are available from GPS signals, it may also be desirable to record date and time information for each stop at the recharging station 102 into memory 62 of the vehicle controller 50, e.g., in the form of a database. If the particular location of the recharging station 102 is a new location, then the GPS location of the recharging station 102 is added to the database, where locations for multiple potential recharging stations 102 are stored. If the particular recharging station 102 location is a previously used location, the vehicle controller 50 can track the number of times (quantity), length (how long) and frequency (how often) that the vehicle 10 is plugged into that particular recharging station 102. This data, which can then also be coupled to other available data such as time of day, day of week, month, outside temperature, inside temperature(s), battery SOC, and other data, to develop, identify, and track a variety of travel patterns. The travel patterns may be related to vehicle 10 and/or the operator of the vehicle 10 depending on the travel pattern identified by the vehicle controller 50.

If desired, various types of additional information may also be obtained and added to the memory 62, such as a database, each time the vehicle 10 is recharged. Such information can include voltage, amperage, recharging time, battery data, temperature(s), fault data, and other battery related operational parameters. If the vehicle 10 stops at the GPS location of a previously used recharging station 102, but the vehicle 10 is not plugged-in for recharging, it may be desirable for that information to be added to the database as well. Consistently recharging at a particular recharging station 102, or group of recharging stations 102, may result in longer battery life and less stress because recharging can be performed over a longer period of time, compared to the necessarily rapid charging methods for conventional vehicles that have primarily onboard recharging capabilities. Similarly to detecting the orientation point 122, equipping the vehicle controller 50 to detect when the vehicle 10 is plugged-in to the recharging station 102, such as a voltage detection system can be included with the vehicle 10.

In another example, the JIT strategy 100 can be self-learning, being transparent to the operator and passengers. The vehicle controller 50 can include fuzzy logic or "smart logic" (possibly including appropriate neural network techniques) to select one or more most likely options for recharging stations 102 given a certain route, operator behavior or pattern, or other data. In one aspect, a process can be provided to simultaneously calculate multiple straight-line distance or actual distance routes, using previously stored "energy routes," the map database 206 and/or navigation system 202, to the multiple possible recharging stations 102 in the general direction of travel. When one of the possible recharging stations 102 becomes available within the limited distance requirement 71 of the battery 19, the vehicle controller 50 can provide outputs 68 to various vehicle components and controllers described herein to efficiently use the energy stored in the battery 19 to arrive at the possible recharging station 102.

Recognizing that different people may reasonably make different individual decisions about whether or not to plug-in the vehicle 10 after a particular trip when given the opportunity, such data may prove to be useful in making "battery discharge, etc." vehicle control decisions. For example, an operator of the vehicle 10, who only plugs-in the vehicle 10 to the recharging station 102 at a home residence of the operator, may only have one potential electric recharging station 102. Additionally, that driver may decide to only plug-in the vehicle 10 at night during the week, and not on weekends. The vehicle controller 50 can self learn this particular pattern of the operator for "plugging-in" the vehicle 10 and adjust the control strategy of the vehicle 10 accordingly for optimal benefit. Depending on the particular drive train 12 and battery 19 characteristics of the vehicle 10, optimal benefit may be to maximize battery life by only allowing the battery 19 of the vehicle 10 to discharge to the minimum SOC 74 during the week, but not on weekends, or vice versa.

In another scenario, if the vehicle 10 bypasses the calculated probable recharging station 102, the vehicle controller 50 can continue to update the straight-line distance or actual probable routes to the next probable recharging locations 102 and modify the target SOC to the optimal SOC 116 when beyond the distance to the next closest probable recharging locations 102. The vehicle controller 50 can appropriately keep or change the predicted destination points 134 and continually update and provide instructions 64 to the vehicle 10 as to deplete the battery 19 to the minimum SOC 74 by using as much battery powered propulsion as possible upon arriving at that updated closest probable recharging station 102. Without having to actually know the intended destination point 134 in advance, by continually updating the multiple probable options for recharging station 102, the vehicle controller 50 can ensure that the vehicle 10 arrives at the actual destination point 134 having maximized the use of stored electricity in the battery 19. Although not always certain, it is highly probable that, as the vehicle 10 continues to be driven along a route of multiple possible recharging stations 102, the set of possible options for recharging stations 102 would be reduced in number. More than likely, there would be no more than a single (or very few) remaining possible options for recharging stations 102 while still at some actual distance from the destination point 134.

In another aspect, based on historic data (quantity, frequency, date and time, etc.) in a database in the memory 62, the vehicle controller 50 can also logically "learn" and rank the most likely one or two destination points 134 during the trip. For example, if the vehicle 10 is usually driven from home to work and back along the same route at approximately the same time every Monday through Friday (typical commute to work), the associated "Home" and "Work" locations for recharging stations 102 would likely become the two most frequently used recharging stations 102. The "most common" routes (for example, from home to work and from work to home) could be predicted by the vehicle controller 50 from the accumulated stored information, and used as "baseline" routes for recharging station 102. The vehicle controller 50 can change the potential new options for recharging station 102, if the vehicle 10 were to deviate from the "learned" baseline routes.

In another example, the vehicle controller 50 can simultaneously record the route of each trip and actual energy use characteristics over time and distance. Types of energy use characteristics already available on most vehicles without navigations systems 202 or map databases 206 includes: throttle and brake settings, electric power, electric charging, vehicle speed, acceleration, deceleration, steering angle, battery SOC, or any other vehicle operational parameters related to travel. Although not necessary, multiple inputs 60 for the map database 206 may be available and can include: the usual road geometry (distance, curvature, etc.); the road elevation (up and down hills) and possibly other selected road attributes (speed limits, interstate, secondary roads. etc.). Furthermore, the use of electricity from the battery 19 to run the air-conditioner 40, as well as the heating/defrost 42, braking system 36, and/or lighting 44, can be taken as an input to the energy-use characteristic. For example, temperature and solar radiation data available in the vehicles for the air conditioning 40 may also be considered. With this data, it may be desirable to calculate the predicted additional electricity that the air-conditioner 40 will use during a trip using the actual weather conditions encountered during a particular trip to modify the energy-use characteristic calculations.

When the vehicle 10 is actually plugged-in to the recharging station 102, the data (GPS location and energy use characteristics) for the last segment between recharging stations 102 can be saved in memory 62 of the vehicle controller 50. Over time, the vehicle 10 can have multiple known routes (from different directions), including energy use characteristics, to the same recharging station 102. On future trips, when the vehicle 10 is moving toward and reaches the known recharging station 102, then that known trip information can be used to calculate a more precise JIT strategy 100 (perhaps as simple as being a more precise continuous change in the target battery SOC) for that trip.

When the vehicle 10 is moving toward the same recharging station 102 approximately on a previously stored route, a more precise JIT strategy 100 may include modifying the target SOC to take advantage of specific route features to further improve vehicle efficiency. For example, if the vehicle 10 travels down a steep hill for the last mile of the route, adding electric charge to the battery 19 through regenerative recovery of energy, the battery would not ordinarily reach the minimum SOC 74 when arriving at the recharging station 102. In that case, the JIT strategy 100 in the vehicle controller 50 could be modified to reach the minimum SOC 74 one mile earlier in the trip, thereby increasing the ability of the battery 19 to receive electricity from the same recharging station 102 without harming the durability of the battery 19. Another example, depending on the particular characteristics of the battery 19, can be to allow the battery 19 to be discharged below the normally acceptable minimum SOC 74 to a low target SOC at the one-mile point before reaching the same known recharging station 102. The low target SOC can be equal to the additional amount of regenerative recovery of energy known to be available during the last mile of travel, but if such specific SOC control would not adversely effect the potential durability of the battery 19. When implemented safely, the JIT strategy 100 with the modified target SOC at a predetermined distance before the recharging station 102 would allow more electric charging from the same known recharging station 102 than would be possible with other strategies for depletion of batteries 19.

To elaborate further on energy use characteristics, the vehicle controller 50 assumes that the energy needed to move the vehicle 10 at a given speed on a given slope is known and provided as an instruction 64 for the vehicle controller 50. The energy use characteristics can be averaged and consulted by the vehicle controller 50 to compute the energy needed to complete a given trip as described above. One of the advantages of this aspect is that the vehicle controller 50 would in effect learn the habits of the operator and the efficiency of the vehicle 10 as it changes over time. Another aspect of the vehicle controller 50 can be to average the energy-use characteristics based on historic data to anticipate or learn the energy needs for each trip for each day and traffic conditions, if the vehicle controller 50 receives traffic condition information. Further optimization could be achieved by sorting trips by time of day and weather and choosing the historical trips most similar to the proposed trip as the model.

The vehicle controller 50 can also include a confidence factor to estimate the energy-use characteristics. The data from previous trips between the same recharging stations 102 may be used by the vehicle controller 50 to derive a degree of confidence in the estimated future energy consumption. In this case, the vehicle controller 50 could compute a confidence factor and adjust the target to being depleting to the minimum SOC 74. In other words, if the vehicle controller 50 has a high degree of confidence in the projected energy-use characteristics, it could allow the battery 19 to discharge earlier or later than prior trips in order for the battery SOC to be at its minimum SOC 74 upon arrival at the projected destination point 134. The data, such as a database, could not only include the confidence factor, but also knowledge of the route and the anticipated slopes, traffic and weather. Thus, the vehicle controller 50 could make the vehicle 10 become more efficient on familiar trips.

In another example, the vehicle controller 50 and the vehicle 10 can be "grid friendly," that is the vehicle 10 can intelligently choose to charge during times of lowest grid electric demand, off peak hours between 9:00 P.M. or 10:00 P.M. and 6:00 A.M., regardless of when vehicle 10 is plugged-in to the recharging station 102. With the ability of the vehicle controller 50 to record each recharging station 102 location/rules, the vehicle controller 50 can determine without needing external signals from the utility or the user when to begin recharging from the grid. The rules of the recharging station 102 refer to the standard or individually customized rules that utility companies negotiate with the vehicle manufacturer or that a regulatory government body imposes through utility legislation. The vehicle controller 50 can determine when and how rapidly to get electricity from the grid. The vehicle controller 50 can also anticipate when an electric utility is likely to be at peak load and modify charge parameters to avoid negatively affecting the grid. For example, to counteract the possibility of sudden spikes at certain times of day due to a sudden large demand, the charging start-up time, ramp-up, peak load, and ramp down can vary and/or be spread out over a determined time period such as a 24 hour period, without needing active communication with the grid.

In another example, although the vehicle controller 50 and the vehicle 10 can be "grid friendly," there may be specific circumstances determined by the vehicle controller 50 with available data inputs 60 under which the vehicle 10 should still immediately commence charging the battery 19 at the instant it is plugged in to the recharging station 102. For example, if the operator of the vehicle 10 has neglected to put consumable fuel in the fuel tank of the vehicle 10, and the consumable fuel tank is approaching empty, the vehicle controller 50 can immediately start charging the battery 19. By not delaying the start of recharging, the potential driving of the vehicle 10 can be maximized in the shortest time possible. This increased potential driving range in the shortest time possible might become very important if the operator of the vehicle 10 needed to make an unexpected trip (for example to a hospital emergency room).

In another example, the vehicle controller 50 can determine to pre-condition to a comfort level with heating or cooling the inside cabin of the vehicle 10 using electricity from the battery 19 or by using electricity from the grid when plugged-in to the recharging station 102. The vehicle controller 50 can use the temperature and solar radiation data, along with historical time, date, and frequency data, to pre-heat the seats of the vehicle 10 and the steering wheel if the vehicle 10 is equipped with such devices, and defrost the windows using the heating/defrost system 42 and/or pre-cool the vehicle 10 using the air conditioning 40. Accordingly, the comfort level can be individualized based on the preferences of the operator of the vehicle 10. By being plugged-in to the recharging station 102, this can allow the battery 19 of the vehicle 10 to remain at the maximum SOC 72 before driving, thus reducing the use of the consumable fuel powered means 13. This, of course, would also significantly improve occupant comfort as well. With the various inputs 60, the vehicle controller 50 can logically control pre-heating and/or pre-cooling for the minimum amount of time necessary for a relatively predictable operator (for example, one who leaves for work at about the same time each morning), while minimizing energy use. As mentioned previously, this also results in using electricity from the recharging station 102, leading to the potential of 15-27% better fuel economy for some trips, rather than using more consumable fuel, such as gasoline or diesel fuel, due to vehicle air-conditioning 40 or heating/defrost 42, which can be counter productive when operating the vehicle 10.

In accordance with the provisions of the patent statutes, the present invention has been described in what is considered to represent its preferred embodiment. However, it should be noted that the invention can be practiced otherwise than as specifically illustrated and described.

The invention claimed is:

1. A system for optimizing rechargeable energy storage device depletion comprising:
    a plug-in hybrid electric vehicle having an electric motor, a consumable fuel powered means, and a rechargeable energy storage device to power the electric motor, wherein the rechargeable energy storage device is configured to be recharged from a recharging station or the consumable fuel powered means, the rechargeable energy storage device having a minimum state of charge (SOC); and
    a controller comprising a computer configured to receive data inputs and provide outputs, the controller configured to define an orientation point representative of a geographic location of the recharging station, to determine a current location of the vehicle, to calculate a straight-line distance between the current location of the vehicle and the orientation point, and to monitor a state of charge (SOC) of the rechargeable energy storage device;
    the controller is further configured to determine an optimal rechargeable energy storage device depletion strategy based on the straight-line distance to substantially sustain the monitored state of charge (SOC) when the straight-line distance is increasing, and to selectively deplete the rechargeable energy storage device to reach about the minimum state of charge (SOC) as the straight-line distance approaches about zero; and
    the controller is further configured to generate the outputs to implement the optimal rechargeable energy storage device depletion strategy.

2. The system of claim 1, wherein the rechargeable energy storage device is a battery.

3. The system of claim 2, wherein the battery is one of a lithium-ion battery and a nickel-metal hydride battery.

4. The system of claim 1 further comprising a voltage detection sensor to detect voltage of the recharging station.

5. The system of claim 1 further comprising a detachable navigation system being configured to be selectively removably attached to the controllers the detachable navigation system including a global positioning system and a map database, wherein the detachable navigation system is configured to provide a latitude, a longitude, and an elevation for the orientation point and for the current location of the vehicle as data inputs for the controller to calculate an actual distance between the orientation point and the current location.

6. The system of claim 5, wherein the controller is further configured to determine the optimal rechargeable energy storage device depletion strategy based on the straight-line distance when the detachable navigation system is detached, and based on the actual distance when the detachable navigation system is attached.

7. The system of claim 1, wherein the consumable fuel powered means is one of an internal combustion engine (ICE) and a hydrogen fuel cell.

8. The system of claim 1, wherein the rechargeable energy storage device is further configured to be recharged from a regenerative means.

9. The system of claim 1 further comprising a detachable global positioning system receiver configured to be selectively removably attached to the controller, wherein the detachable global positioning system receiver provides a latitude and a longitude for the orientation point and for the current location of the vehicle as data inputs for the controller to calculate an actual distance.

10. The system of claim 9, wherein the controller is configured to determine the optimal rechargeable energy storage device depletion strategy based on the straight-line distance when the global positioning system receiver is detached and based on either the straight-line distance or the actual distance when the global positioning system receiver is attached.

11. A method of optimizing depletion of a rechargeable energy storage device of a plug-in hybrid electric vehicle to a minimum state of charge (SOC), the method comprising the steps of:
defining an orientation point representative of a geographic location of a recharging station;
repeatedly determining a present location of said vehicle in response to changes in location of said vehicle;
repeatedly calculating a straight-line distance between the orientation point and the determined present location of said vehicle;
monitoring a state of charge (SOC) of said rechargeable energy storage device;
substantially sustaining the monitored state of charge (SOC) of said rechargeable energy storage device when the calculated straight-line distance between the orientation point and the determined present location is increasing;
initiating depletion of said rechargeable energy storage device to about said minimum state of charge (SOC) when the calculated straight-line distance between the orientation point and the determined present location is decreasing; and
said rechargeable energy storage device about reaching said minimum state of charge (SOC) when the calculated straight-line distance is about zero.

12. The method of claim 11, wherein the orientation point is defined by sensing an input signal indicative of the recharging station; and storing the orientation point representative of the geographic location of the recharging station.

13. The method of claim 11 further comprising the step of reverting to one of substantially sustaining the monitored state of charge (SOC) of said rechargeable energy storage device and initiating depletion of said rechargeable energy storage device to said about minimum state of charge (SOC), whichever is the most recently executed, when the calculated straight-line distance is substantially unchanged.

14. The method of claim 11 further comprising the step of calculating an estimated state of charge (SOC) needed for the vehicle to return to the orientation point with said rechargeable energy storage device being at about said minimum state of charge (SOC).

15. The method of claim 14 further comprising the step of comparing the calculated estimated state of charge (SOC) with the monitored state of charge (SOC) needed for the vehicle to return to the orientation point with said rechargeable energy storage device being at about said minimum state of charge (SOC).

16. The method of claim 15 further comprising the steps of:
substantially sustaining the monitored state of charge (SOC) of said rechargeable energy storage device when the monitored state of charge (SOC) is less than the calculated estimated state of charge (SOC); and
initiating depletion of said rechargeable energy storage device to about the calculated estimated state of charge (SOC) when the monitored state of charge (SOC) is greater than the calculated estimated state of charge (SOC).

17. The method of claim 15 further comprising the step of initiating recharge of said rechargeable energy storage device to about the calculated estimated state of charge (SOC) when the monitored state of charge (SOC) is less than the calculated estimated state of charge (SOC).

18. The method of claim 11 further comprising the step of comparing the calculated straight-line distance with a predetermined limited distance requirement of said rechargeable energy storage device.

19. The method of claim 18 further comprising the step of depleting said rechargeable energy storage device to about said minimum state of charge (SOC) when the calculated straight-line distance is less than the predetermined limited distance requirement of said rechargeable energy storage device.

20. The method of claim 11 further comprising the step of calculating an actual distance between the orientation point and the determined present location of said vehicle.

21. The method of claim 20 further comprising the steps of:
substantially sustaining the monitored state of charge (SOC) of said rechargeable energy storage device when the calculated actual distance is increasing from the orientation point;
initiating depletion of said rechargeable energy storage device to said minimum state of charge (SOC) when the calculated actual distance is decreasing from the orientation point;
said rechargeable energy storage device about reaching said minimum state of charge (SOC) when the calculated actual distance is about zero.

22. The method of claim 21 further comprising the steps of comparing the calculated actual distance with a predetermined limited distance requirement of said rechargeable energy storage device; and depleting said rechargeable energy storage device to about said minimum state of charge (SOC) when the calculated actual distance is less than the predetermined limited distance requirement of said rechargeable energy storage device.

23. The method of claim 20 further comprising the step of detecting one of a navigation system and a global positioning system receiver, wherein the one of the navigation system and the global positioning system receiver provides inputs for calculating either the straight-line distance or the actual distance between the orientation point and the determined present location of said vehicle.

24. The method of claim 11, wherein the steps are performed fully automated without external inputs from outside said vehicle.

25. The method of claim 11 further comprising the steps of initiating depletion of said rechargeable energy storage device to about an optimal state of charge (SOC) and substantially sustaining the state of charge (SOC) of said rechargeable energy storage device at about the optimal state of charge (SOC) before depleting said rechargeable energy storage device to about the minimum state of charge (SOC), wherein the optimal state of charge (SOC) is greater than the minimum state of charge (SOC).

26. The method of claim 25, further comprising the steps of determining a target state of charge (SOC) for future depletion before depleting said rechargeable energy storage device to about the minimum state of charge (SOC); and initiating recharge of said rechargeable energy storage device to about the determined target state of charge (SOC).

27. The method of claim 26, wherein the determined target state of charge (SOC) for future depletion is greater than the optimal state of charge (SOC).

28. The method of claim 11, wherein the orientation point is defined by sensing an input signal indicative of the recharging station, which is a first recharging station, and defining the orientation point representative of the geographic location of the first recharging station, the method further comprising the steps of sensing an input signal indicative of a second recharging station at a different geographic location than the first recharging station; and storing a destination point representative of the geographic location of the second recharging station.

29. The method of claim 28, where the straight-line distance is a first straight-line distance, the method further comprising the steps of:
- repeatedly calculating a second straight-line distance between the destination point and the determined present location of said vehicle;
- comparing each of the first straight-line distance and the second straight-line distance with a predetermined limited distance requirement of said rechargeable energy storage device;
- comparing the first straight-line distance and the second straight-line distance to determine which is smaller;
- initiating depletion of said rechargeable energy storage device to about said minimum state of charge (SOC) when either the first straight-line distance or the second straight-line distance is less than the predetermined limited distance requirement of said rechargeable energy storage device.

30. The method of claim 29 further comprising the step of substantially sustaining the monitored state of charge (SOC) of said rechargeable energy storage device when both the first straight-line distance and the second straight-line distance are greater than the predetermined limited distance requirement of said rechargeable energy storage device.

31. A computer-usable medium comprising a plurality of computer readable instructions stored thereon that, in response to execution by a processor, causes the processor to:
- generate and store an orientation point for a plug-in hybrid electric vehicle having a rechargeable energy storage device, wherein the orientation point comprises a recharging station;
- determine, at a first time instant, a first straight-line distance between a first current location of the vehicle and the orientation point,
- determine, at a second time instant, a second straight-line distance between a second current location of the vehicle and the orientation point,
- initiate a charge sustaining phase of the rechargeable energy storage device when the second straight-line distance is greater than the first straight-line distance; and
- initiate a charge depleting phase of the rechargeable energy storage device when the second straight-line distance is less than the first straight-line distance, and the second straight-line distance is less than a limited distance requirement of the rechargeable energy storage device.

32. The computer-usable medium of claim 31, wherein the plurality of computer readable instructions further causes the processor to initiate one of substantially sustaining the monitored state of charge (SOC) of said rechargeable energy storage device and depleting said rechargeable energy storage device to about said minimum state of charge (SOC), whichever is the most recently initiated, when the second straight-line distance is substantially unchanged from the first straight-line distance.

33. The computer-usable medium of claim 31, wherein the plurality of computer readable instructions further causes the processor to determine, at the first time instant, a first actual distance between the first current location of the vehicle and the orientation point; and determine, at the second time instant, a second actual distance between the second current location of the vehicle and the orientation point.

34. The computer-usable medium of claim 33, wherein the plurality of computer readable instructions further causes the processor to initiate the charge sustaining phase when the second actual distance is more than the limited distance requirement of the rechargeable energy storage device; and initiate the charge depleting phase when the second actual distance is less than the limited distance requirement of the rechargeable energy storage device.

35. The computer-usable medium of claim 31, wherein the plurality of computer readable instructions further causes the processor to detect the recharging station when the recharging station is connected to the vehicle.

36. The computer-usable medium of claim 35, wherein the plurality of computer readable instructions further causes the processor to determine a recharge time from the recharging station during a period of lowest grid electric demand and to initiate recharge at the determined recharge time with electricity from the detected recharging station.

37. The computer-usable medium of claim 35, wherein the plurality of computer readable instructions further causes the processor to determine a comfort level of a cabin of the plug-in hybrid electric vehicle and to initiate a preconditioning phase to condition the cabin to the comfort level with electricity from the detected recharging station or from the rechargeable energy storage device.

38. The computer-usable medium of claim 37, wherein the plurality of computer readable instructions further causes the processor to initiate a heating/defrost system to pre-heat the cabin to the comfort level or an air conditioning system to pre-cool the cabin to the comfort level, during the preconditioning phase.

* * * * *

UNITED STATES PATENT AND TRADEMARK OFFICE
CERTIFICATE OF CORRECTION

PATENT NO. : 7,849,944 B2  
APPLICATION NO. : 12/137744  
DATED : December 14, 2010  
INVENTOR(S) : Robert C. DeVault Page 1 of 1

It is certified that error appears in the above-identified patent and that said Letters Patent is hereby corrected as shown below:

In the Specification

In column 1, lines 34-35, please delete the phrase "Such hybrid vehicles are displacing electric-only vehicles, as well as conventional".

In column 1, line 56, please delete the "," following "is".

In column 5, line 58, please delete "by" and insert in lieu thereof --be--.

In column 13, line 30, please delete "1221" and insert in lieu thereof --122,--.

In the Claims

In column 22, line 42, please delete "controllers" and insert in lieu thereof --controller--.

Signed and Sealed this
Fifteenth Day of February, 2011

David J. Kappos
*Director of the United States Patent and Trademark Office*